(12) United States Patent
Gu et al.

(10) Patent No.: US 12,496,555 B2
(45) Date of Patent: Dec. 16, 2025

(54) BLOCK COPOLYMER TEMPLATED CRAZING FOR MEMBRANE SEPARATION

(71) Applicants: Xiaodan Gu, Hattiesburg, MS (US); Daniel Weller, Liberty Lake, WA (US)

(72) Inventors: Xiaodan Gu, Hattiesburg, MS (US); Daniel Weller, Liberty Lake, WA (US)

(73) Assignee: THE UNIVERSITY OF SOUTHERN MISSISSIPPI

( * ) Notice: Subject to any disclaimer, the term of this patent is extended or adjusted under 35 U.S.C. 154(b) by 482 days.

(21) Appl. No.: 17/590,150

(22) Filed: Feb. 1, 2022

(65) Prior Publication Data

US 2022/0241731 A1 Aug. 4, 2022

Related U.S. Application Data

(60) Provisional application No. 63/144,194, filed on Feb. 1, 2021.

(51) Int. Cl.
*B01D 69/12* (2006.01)
*B01D 61/14* (2006.01)
(Continued)

(52) U.S. Cl.
CPC ........... *B01D 69/12* (2013.01); *B01D 61/145* (2013.01); *B01D 67/0027* (2013.01); *B01D 69/02* (2013.01); *B01D 71/281* (2022.08); *B01D 71/283* (2022.08); *B01D 71/5211* (2022.08); *B01D 71/5222* (2022.08); *B01D 71/80* (2013.01); *C08J 5/18* (2013.01); *C08L 53/00* (2013.01); *B01D 2325/02833* (2022.08);
(Continued)

(58) Field of Classification Search
None
See application file for complete search history.

(56) References Cited

U.S. PATENT DOCUMENTS

| 4,595,707 A | 6/1986 | McCreedy et al. |
| 5,998,007 A | 12/1999 | Prutkin et al. |

(Continued)

FOREIGN PATENT DOCUMENTS

WO 2019177067 A1 9/2019

OTHER PUBLICATIONS

Hao Yang, et al., Antifouling ultrafiltration membranes by selective swelling of polystyrene/poly(ethylene oxide) block copolymers, Journal of Membrane Science, vol. 542, 2017, pp. 226-232 (Year: 2017).*

*Primary Examiner* — Magali P Slawski
*Assistant Examiner* — Eric J Mccullough
(74) *Attorney, Agent, or Firm* — MENDELSOHN DUNLEAVY P.C.; Kevin J. Dunleavy; Kristina I. Sanchez

(57) ABSTRACT

A porous composite ultrafiltration membrane including a block copolymer layer having (a) one or more soft block polymer(s) having an elongation at break of greater than about 50%, as measured by ASTM D638 and an elastic modulus of between 10 MPa to 3 GPa as measured by the ASTM D638 tensile test; and (b) one or more hard block polymer(s) having an elongation at break of less than about 65%, as measured by ASTM D638, and an elastic modulus of higher than 1 GPa as measured by the ASTM D638 tensile test, and a macroporous support layer having a pore size larger than a pore size of the block copolymer layer. Also described is a method for making the porous composite membrane.

16 Claims, 28 Drawing Sheets

(51) Int. Cl.
  *B01D 67/00* (2006.01)
  *B01D 69/02* (2006.01)
  *B01D 71/28* (2006.01)
  *B01D 71/52* (2006.01)
  *B01D 71/80* (2006.01)
  *C08J 5/18* (2006.01)
  *C08L 53/00* (2006.01)

(52) U.S. Cl.
  CPC ...... *B01D 2325/04* (2013.01); *B01D 2325/24* (2013.01); *B01D 2325/34* (2013.01); *C08J 2353/00* (2013.01); *C08J 2481/06* (2013.01); *C08L 2203/16* (2013.01)

(56) References Cited

U.S. PATENT DOCUMENTS

| | | |
|---|---|---|
| 6,824,680 B2 | 11/2004 | Chandavasu et al. |
| 10,158,146 B2 | 12/2018 | Pratt et al. |
| 11,154,384 B2 | 10/2021 | Li et al. |
| 2015/0224538 A1* | 8/2015 | Takeko .................. B01D 71/80 427/385.5 |
| 2017/0327649 A1* | 11/2017 | Wiesner ............... B01D 71/262 |

* cited by examiner 10 mm

BLOCK COPOLYMER TEMPLATED CRAZING FOR MEMBRANE SEPARATION

CROSS REFERENCE TO RELATED APPLICATIONS

This application claims the benefit of U.S. Provisional Application No. 63/144,194, filed on Feb. 1, 2021, the entire disclosure of which is hereby incorporated by reference as if set forth fully herein.

FIELD OF THE INVENTION

This invention relates to the manufacture of porous composite membranes. This invention decreases pore size, thus creating membranes capable of ultrafiltration (i.e., <40 nm) using templated craze formation by tensile drawing.

BACKGROUND OF THE INVENTION

The ever-increasing demand for clean water requires improvements to current water filtration technologies. Ultrafiltration membranes are particularly useful because their pores are appropriately sized to remove bacteria and viruses making them valuable for drinking water purification, dairy processing, as well as waste-water reclamation. Other filtration methods, such as dense reverse osmosis membranes employ a solution-diffusion model. In contrast, ultrafiltration membranes rely on a size-selective sieving mechanism. As such, pore structure is the primary factor determining ultrafiltration performance. Reducing a membrane's pore size distribution has been shown to increase selectivity, while increasing porosity and reducing thickness improves its permeability. Block-copolymers (BCP) have gained considerable attention in this capacity due to their ability to rapidly self-assemble into densely packed isoporous structures.

Initial BCP membranes were used as thick bulk membranes, and had low permeability. Changes to the manufacturing process were made to create asymmetric BCP membranes consisting of a thin isoporous selective layer that transitioned into a macroporous support. The thickness of the selective layer was reduced to just a few microns and permeabilities were greatly improved. However, the high cost of BCP makes these membranes not economically viable. Composite membranes have been proposed as a solution to this problem. By using a thin layer of BCP on top of an inexpensive support, material costs can be dramatically reduced. Such composite membranes have been made by casting BCP onto a sacrificial substrate and then transferring the BCP layer to a macroporous support. This approach showed that thin composite membranes could be made with desirable filtration properties, however the manufacturing process is laborious and not scalable. As a result, new techniques to simplify the manufacturing process were needed. For example, BCP films could be formed on the surface of a water filled support by using a hydrophobic solvent. In this manner, thin (<100 nm thickness), robust, selective layers could be made with the incorporation of a soft block. Although improved, the pore formation process typically requires an acid/base etching process, and thus is time consuming. Consequently, such processes are not suitable for commercialization.

Lately, there has been a push to develop roll-to-roll manufacturing techniques for BCP membranes. One of the challenging aspects of roll-to-roll BCP membrane manufacture is pore formation. Many of the common pore forming strategies such as minor block removal or reconstruction can be slow and difficult to control, and membranes made by phase inversion require large amounts of costly BCP.

In summary, BCP ultrafiltration membranes show improved performance compared to homopolymer membranes, although increased manufacturing and material costs have thus far prohibited their industrial application.

U.S. Pat. No. 6,824,680 relates to microporous films prepared from immiscible blends of at least two components, preferably polymers, which are produced via melt processing a film formed from the polymers. The films include microcracks or crazing throughout the film extending from one surface of the film to the other in order to provide the desire porosity.

U.S. Pat. No. 5,998,007 relates to a multi-directionally stretch-crazed microencapsulated polymer film having a matrix material and including microcapsules formed in the matrix material in the form of crazes which are filed with an encapsulated substance and oriented at least in two mutually intersecting directions.

International Publication WO 2019/177067 relates to a method of manufacturing a structured polymeric material that is partially cross-linked. The partially cross-linked polymeric material is then contacted with a solvent to cause expansion and crazing of at least some of the non-cross-linked regions to form a structured polymeric material containing pores.

SUMMARY OF THE INVENTION

A new pore formation process is provided for the manufacture of composite ultrafiltration membranes by mechanical stretching of an ultrathin block copolymer film. Phase separated block copolymer (BCP) thin films supported on a porous polyethersulfone (PES) support craze under tensile strain, leaving behind pores of predictable size based on initial domain size and extent of strain. The high aspect ratio pores formed in this process create membranes which are highly permeable $$\left(850 \frac{L}{M^2 \cdot hr \cdot bar}\right)$$

but also provide near complete rejection of 40 nm diameter gold nanoparticles (AuNP). Using BCP's inherent ability to cavitate under strain, tedious block removal steps are avoided. High performance membranes can thus be prepared in a simple, scalable process, with pore sizes much smaller than those created using common stretching techniques.

The present invention provides a new method that can be used to rapidly create thin BCP membranes without the need for a block removal or reconstruction step. In one embodiment, poly(styrene)-block-poly(ethyleneoxide) (PS-b-PEO) diblock copolymer was spun cast onto a water filled poly (ethersulfone) (PES) macroporous support. Application of tensile strain caused the minor block domains to cavitate and elongate thereby creating a nanoporous structure. Utilization of this rapid and repeatable minor block cavitation under strain provides cheap, effective, and scalable BCP membranes.

In one aspect, the present invention relates to a porous composite ultrafiltration membrane including:
  a block copolymer layer, comprising
    a) one or more soft block polymer(s) having an elongation at break of greater than about 50%, as measured by ASTM D638 and an elastic modulus of between 10 MPa to 3 GPa as measured by the ASTM D638 tensile test; and b) one or more hard block polymer(s) having an elongation at break of less than about 65%, as measured by ASTM D638, and an elastic modulus of higher than 1 GPa as measured by the ASTM D638 tensile test. and a macroporous support layer having a pore size larger than a pore size of the block copolymer layer.

The composite membrane may include one or more hard blocks selected from the group consisting of a polystyrene block, a polymethacrylate block, a poly (methyl methacrylate) block, a polyvinylpyridine block, a polyvinylcyclohexane block, a polyimide block, a polyamide block, a polypropylene block, a poly (2,6-dimethyl-1,4-phenylene oxide) block, a polyolefin block, a poly (t-butyl vinyl ether) block, a poly (cyclohexyl methacrylate) block, a poly (cyclohexyl vinyl ether) block, poly (t-butyl vinyl ether) block, polyethylene block, and polyvinylidene fluoride block and combinations thereof.

The composite membrane of any of the foregoing embodiments may include one or more soft blocks selected from the group consisting of polystyrene-block-poly(4-vinylpyridine), polystyrene-b-poly(methyl methacrylate), poly(D.L-lactide, and polystyrene-block-polylactide. The one or more soft block polymer(s) may preferably include a polyethylene (oxide) block. The one or more soft block polymer(s) may be present in an amount of from about 5% by volume to less than 50% by volume, or from about 10% by volume to about 40% by volume, or from about 15% by volume to about 30% by volume, based on the total volume of the block copolymer.

In each of the foregoing embodiments, the one or more hard block polymer(s) may be present in an amount of greater than 50% by volume to less than 95% by volume, or from about 60% by volume to less than 90% by volume, or from about 70% by volume to about 85% by volume, based on the total volume of the block copolymer.

In each of the foregoing embodiments, the one or more soft block polymer(s) may be covalently bonded to the one or more hard block polymer(s).

In each of the foregoing embodiments, the block copolymer layer may have a thickness of greater than 50 nm, or greater than 70 nm, or from about 50 nm to about 1 μm, or from about 50 nm to about 500 nm, or from about 70 nm to about 300 nm, or from about 140 nm to about 200 nm.

In each of the foregoing embodiments, the macroporous support may include a polymer selected from the group consisting of polyethersulfone, polyphenylsulfone, polyacrylonitrile, polyester, polyether ether ketone, polyvinylidene fluoride, and polytetrafluoroethylene.

In each of the foregoing embodiments, the block copolymer layer may have a pore width of less than 40 nm, or no greater than 30 nm, or no greater than 15 nm, or from about 1 nm to about 10 nm.

In each of the foregoing embodiments, the one or more hard block copolymer(s) may have a number average molecular weight of from about 10,000 g/mol to about 500,000 g/mol, or from greater than 35,000 g/mol to about less than 170,000 g/mol, or from about 50,000 g/mol to about 150,000 g/mol, or from greater than 80,000 g/mol to about 150,000 g/mol, as measured by gel permeation chromatography.

In each of the foregoing embodiments, the one or more soft block copolymer(s) may have a number average molecular weight of from about 1,000 g/mol to about 75,000 g/mol, or from greater than 10,000 g/mol to about less than 50,000 g/mol, or from about 20,000 g/mol to about 45,000 g/mol, as measured by gel permeation chromatography.

In each of the foregoing embodiments, the block copolymer layer may be devoid of random polymers.

In each of the foregoing embodiments, the macroporous support layer may be saturated with water.

In each of the foregoing embodiments, the block copolymer layer may include a poly(styrene) hard block and a poly(ethylene oxide) soft block.

In another aspect, the invention relates to a method of making a porous composite ultrafiltration membrane comprising steps of:

a) depositing a block copolymer layer onto a macroporous support layer to form a composite membrane, wherein the block copolymer layer comprises:

one or more soft block polymer(s) having an elongation at break of greater than about 50%, as measured by ASTM D638 and an elastic modulus of between 10 MPa to 3 GPa as measured by the ASTM D638 tensile test; and one or more hard block polymer(s) having an elongation at break of less than about 65%, as measured by ASTM D638, and an elastic modulus of higher than 1 GPa as measured by the ASTM D638 tensile test, and b) applying tensile strain to the composite membrane to form the porous composite ultrafiltration membrane.

In the method, the step of applying tensile strain may involve stretching the composite membrane by at least 10%, based on an original dimension of the composite membrane.

In each of the foregoing embodiments of the method, the macroporous support is infused with water prior to the depositing of the copolymer to form a saturated macroporous support.

Each of the foregoing embodiments of the method may further include a step of drying the composite membrane prior to the step of applying tensile strain.

In another aspect, the present invention relates to a porous composite ultrafiltration membrane formed by any of the foregoing methods.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

FIG. 1A shows the composite membrane manufacturing process.

FIG. 1B shows two motor uniaxial stretching devices. The dotted circle represents approximate tested membrane size.

FIG. 1C shows scanning electron microscopy (SEM) images of PS-b-PEO (polystyrene block—polyethylene oxide block) 110 kDa on a PES substrate before stretch.

FIG. 1D shows SEM images of PS-b-PEO 110 kDa on a PES substrate after stretch.

FIG. 2A shows H₂O permeability and 40 nm gold nanoparticle (AuNP) rejection after application of different levels of strain.

FIG. 2B shows an SEM image of the composite membrane at 0% strain.

FIG. 2C shows an SEM image of the composite membrane at 10% strain.

FIG. 2D shows an SEM image of the composite membrane at 20% strain.

and all rejections are for 40 nm diameter AuNPs.

Figure 3A:
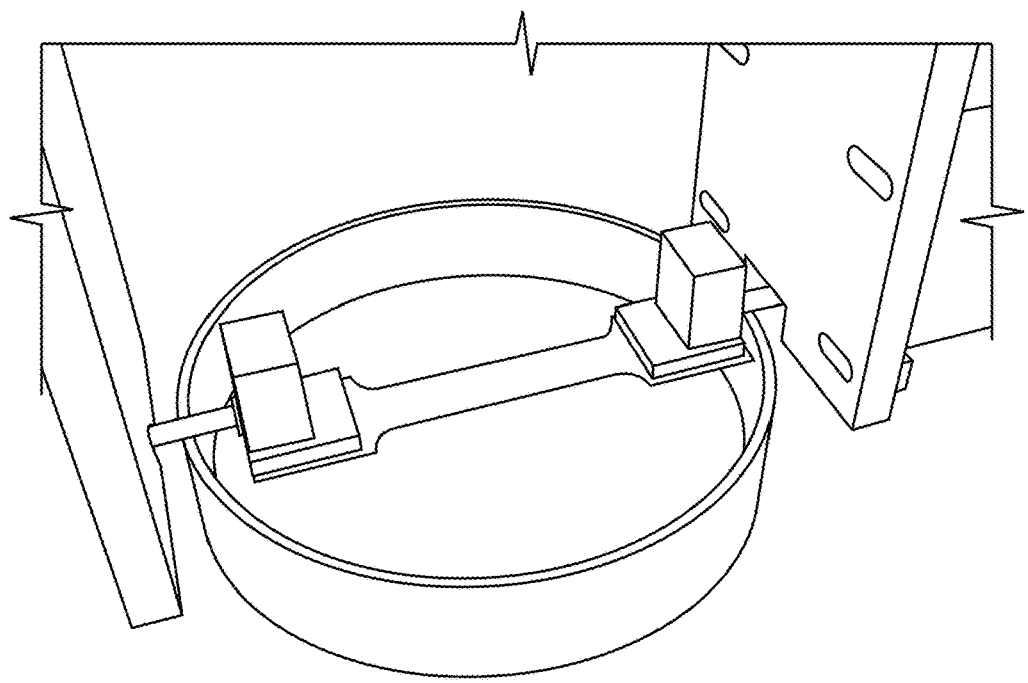
FIGS. 3A-3F show the effects of the polymer on selective layer behavior. All permeabilities ("Perm.") are in $$\frac{L}{M^2 \times hr \times bar}$$

FIG. 3A shows a schematic of a film-on-water thin-film tensile tester.

Figure 3B:
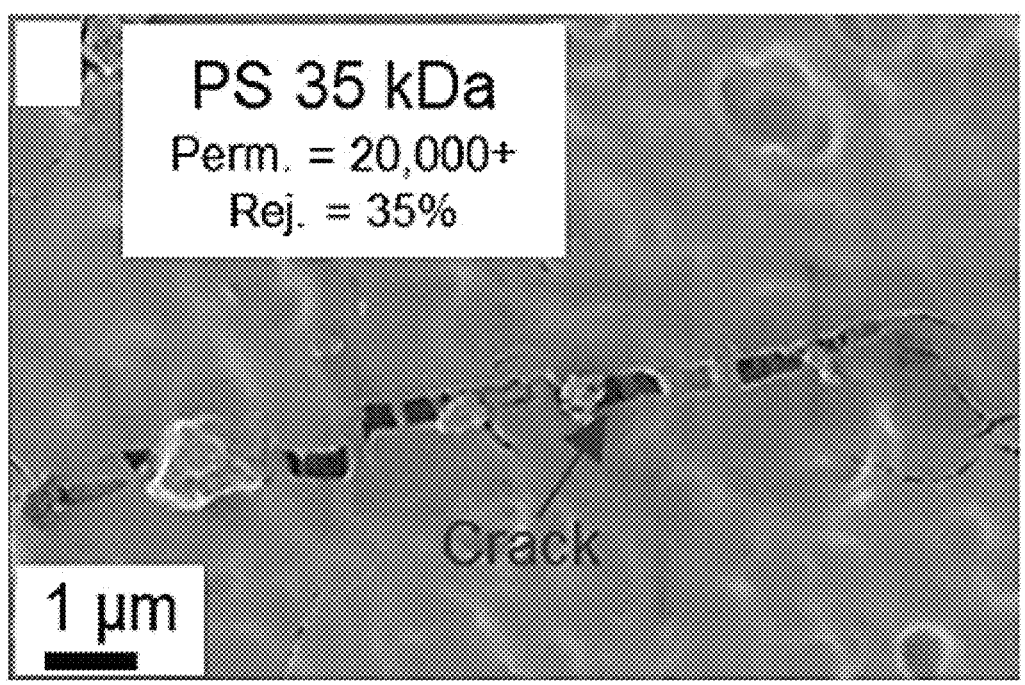

FIG. 3B shows polystyrene (PS) 35 kDa shear deformation zone (SDZ) formation.

Figure 3C:
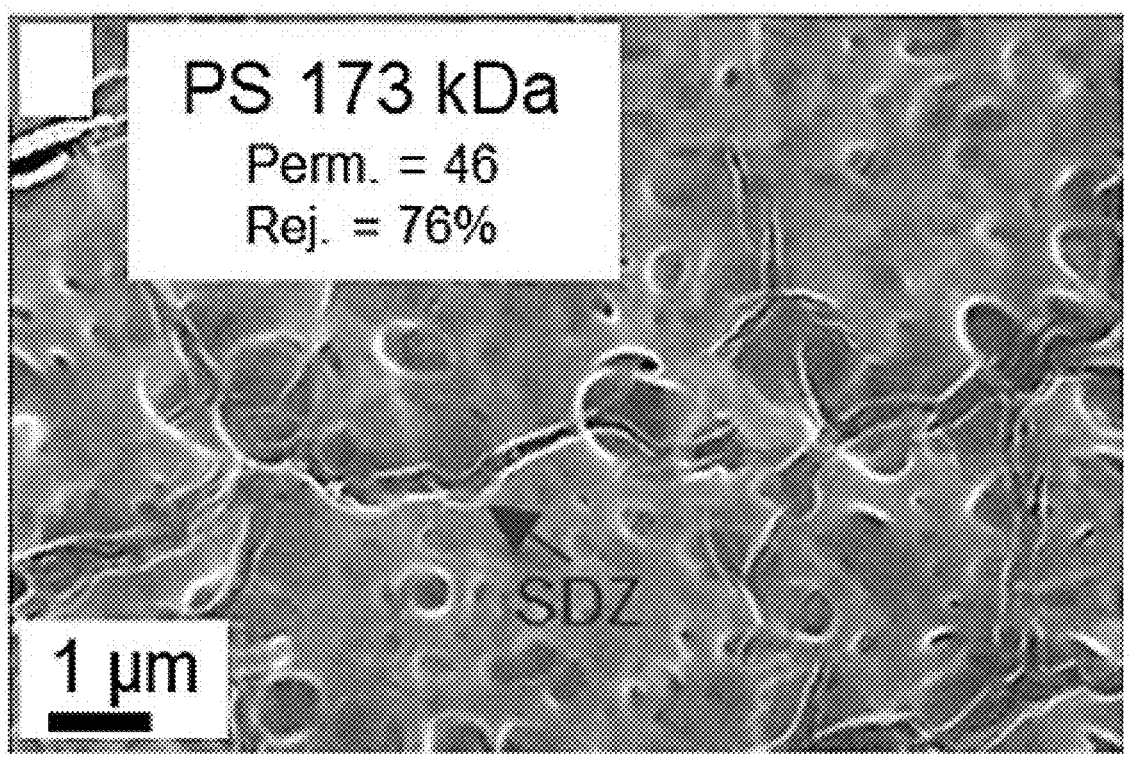

FIG. 3C shows PS 173 kDa shear deformation zone (SDZ) formation.

Figure 3D:
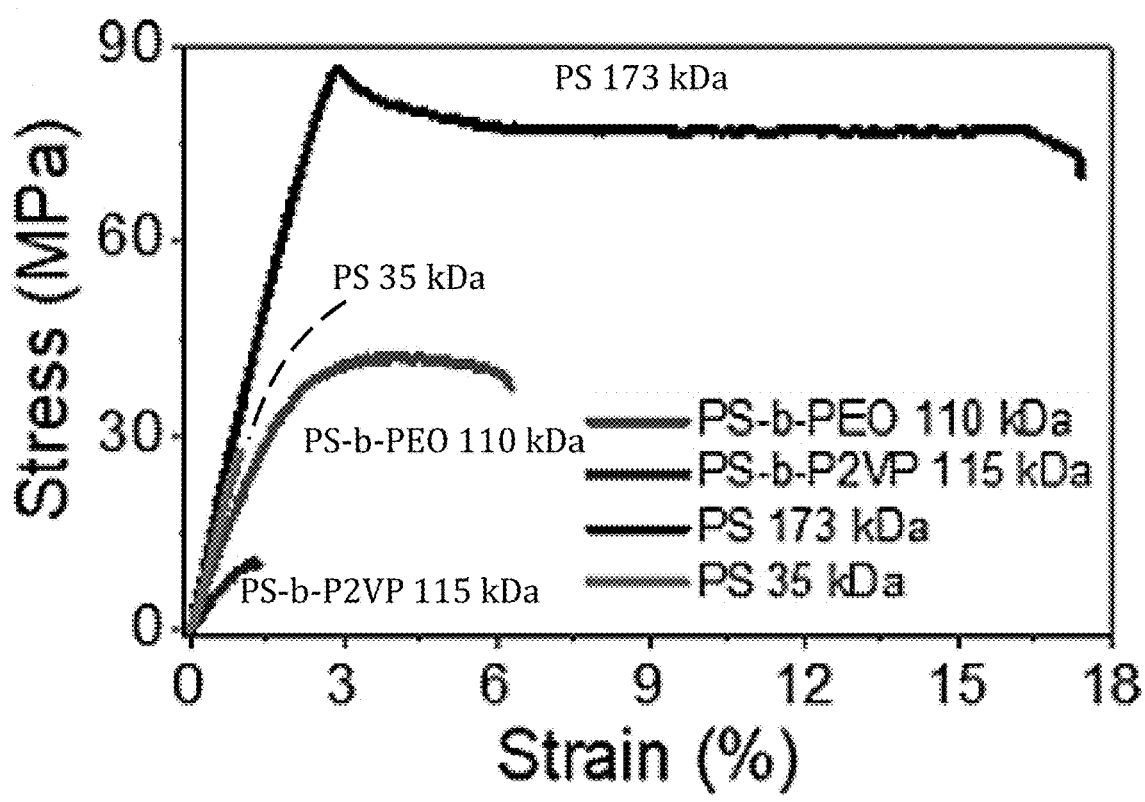

FIG. 3D shows stress-strain curves for 100 nm films-on-water.

Figure 3E:
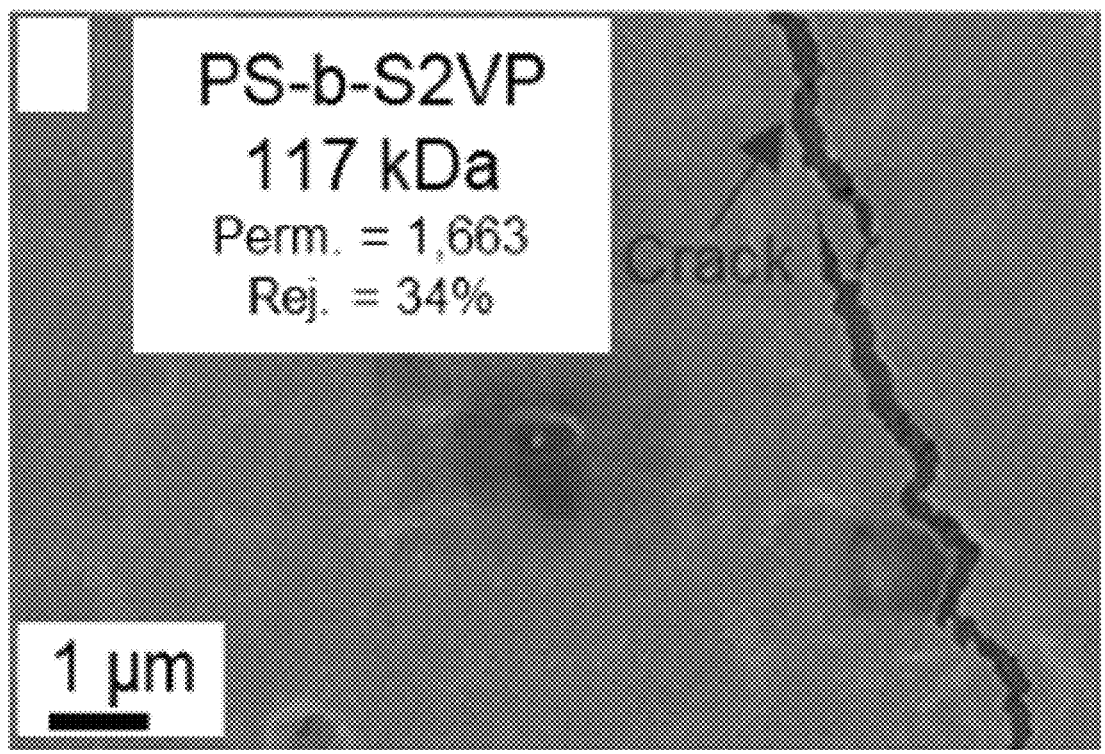

FIG. 3E shows the crack formation of polystyrene-block-poly(2-vinylpyridine) block (PS-b-P2VP) 115 kDa.

Figure 3F:
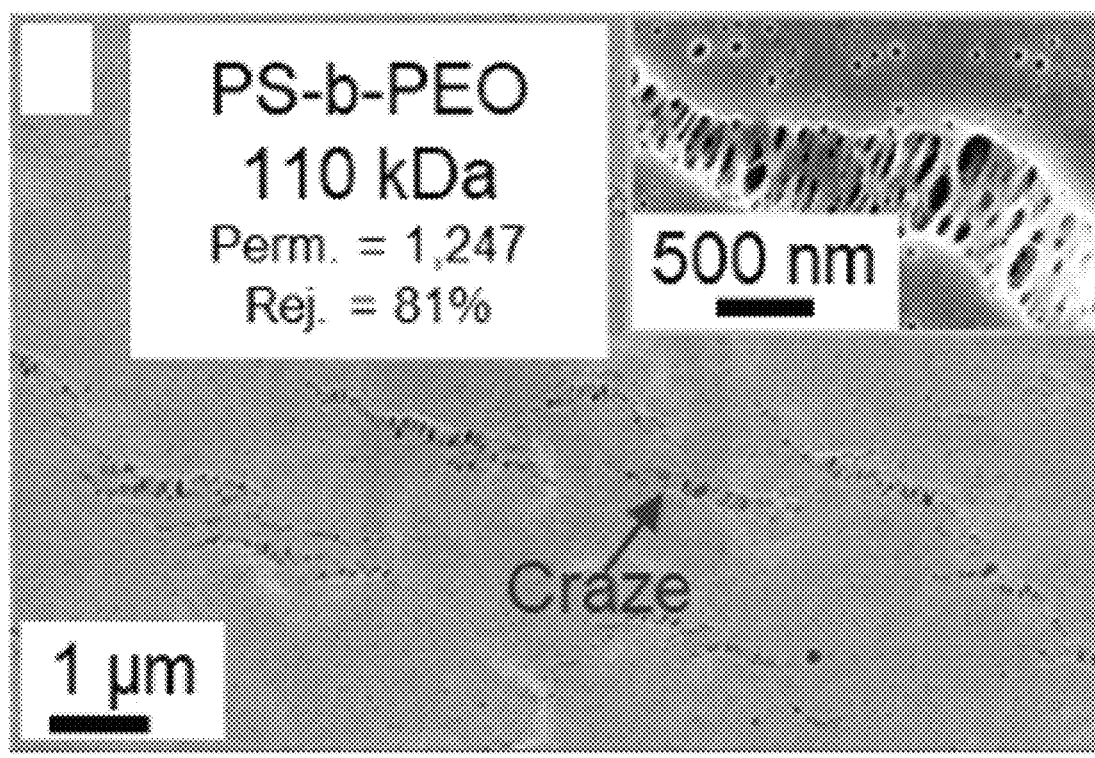

FIG. 3F shows the craze formation of PS-b-PEO 110 kDa.

FIGS. 4A-4D show the effect of molecular weight for PS-b-PEO samples on tensile strength, composite membrane performance, and craze formation. All permeabilities ("Perm.") are in $$\frac{L}{M^2 \times hr \times bar}$$

and all rejections are for 40 nm diameter AuNPs.

Figure 4A:
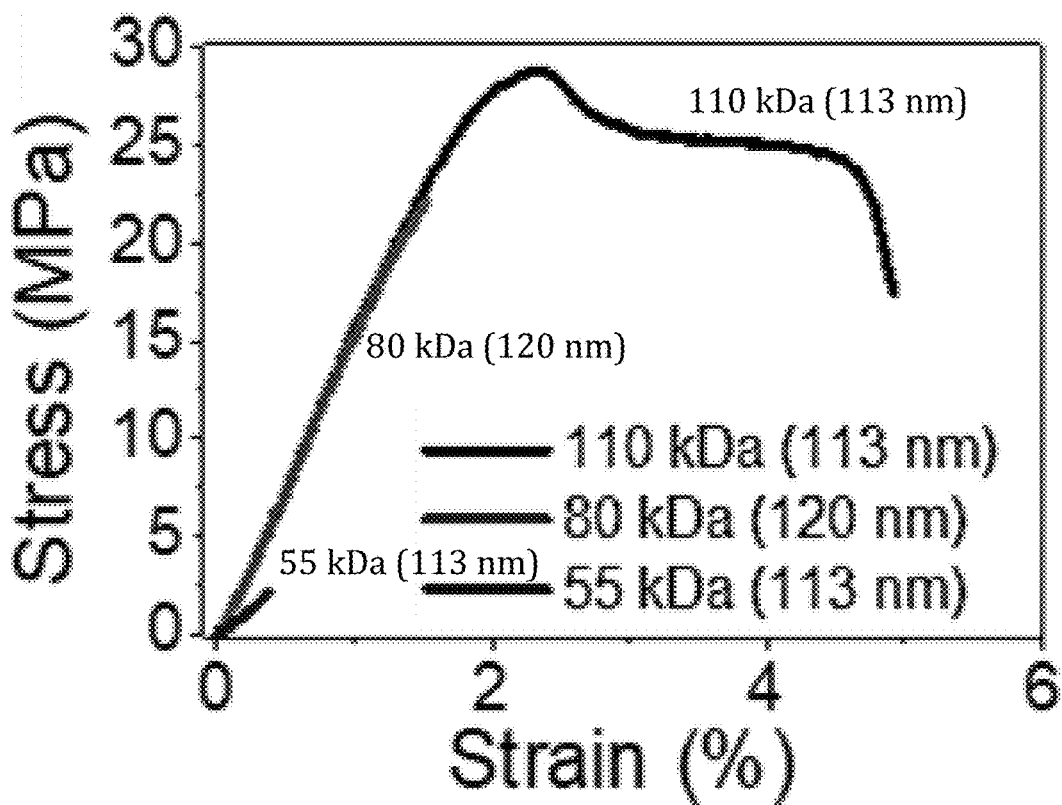

FIG. 4A shows thin-film stress-strain data.

Figure 4B:
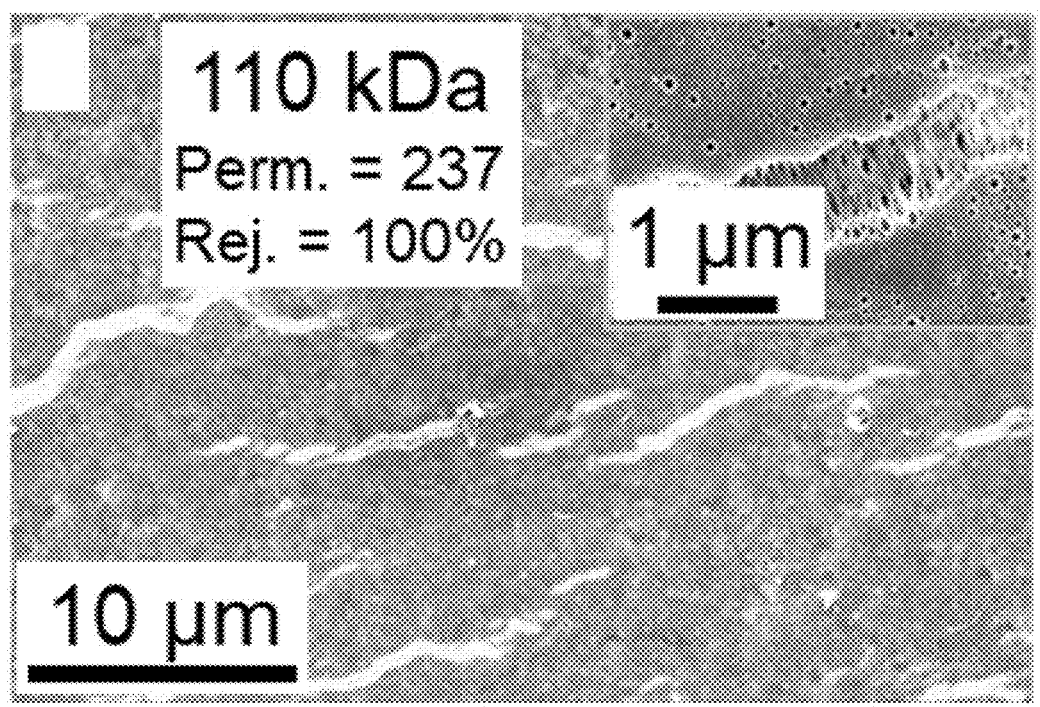

FIG. 4B shows membrane performance and morphology of PS-b-PEO 110 kDa after 10% strain.

Figure 4C:
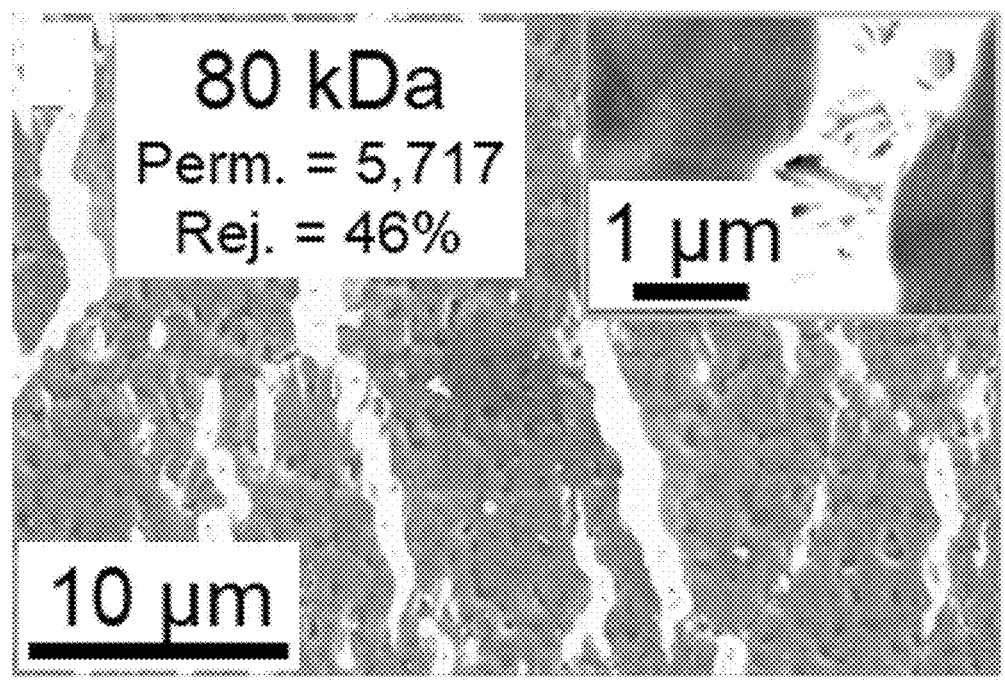

FIG. 4C shows membrane performance and morphology of PS-b-PEO 80 kDa after 10% strain.

Figure 4D:
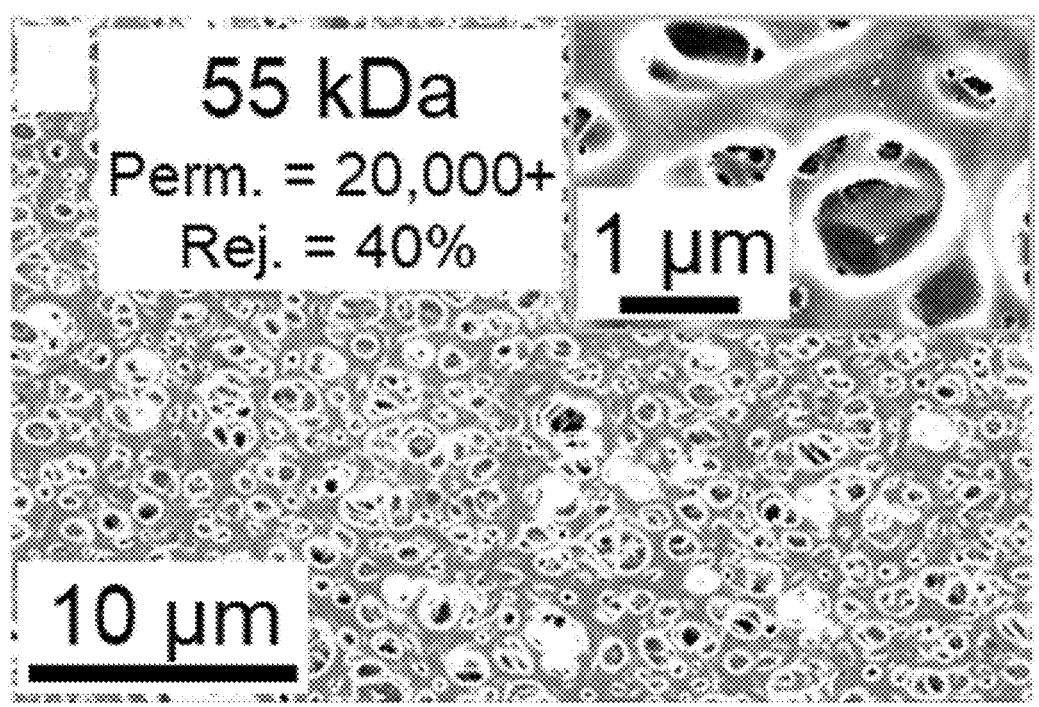

FIG. 4D shows membrane performance and morphology of PS-b-PEO 55 kDa after 10% strain.

Figure 5A:
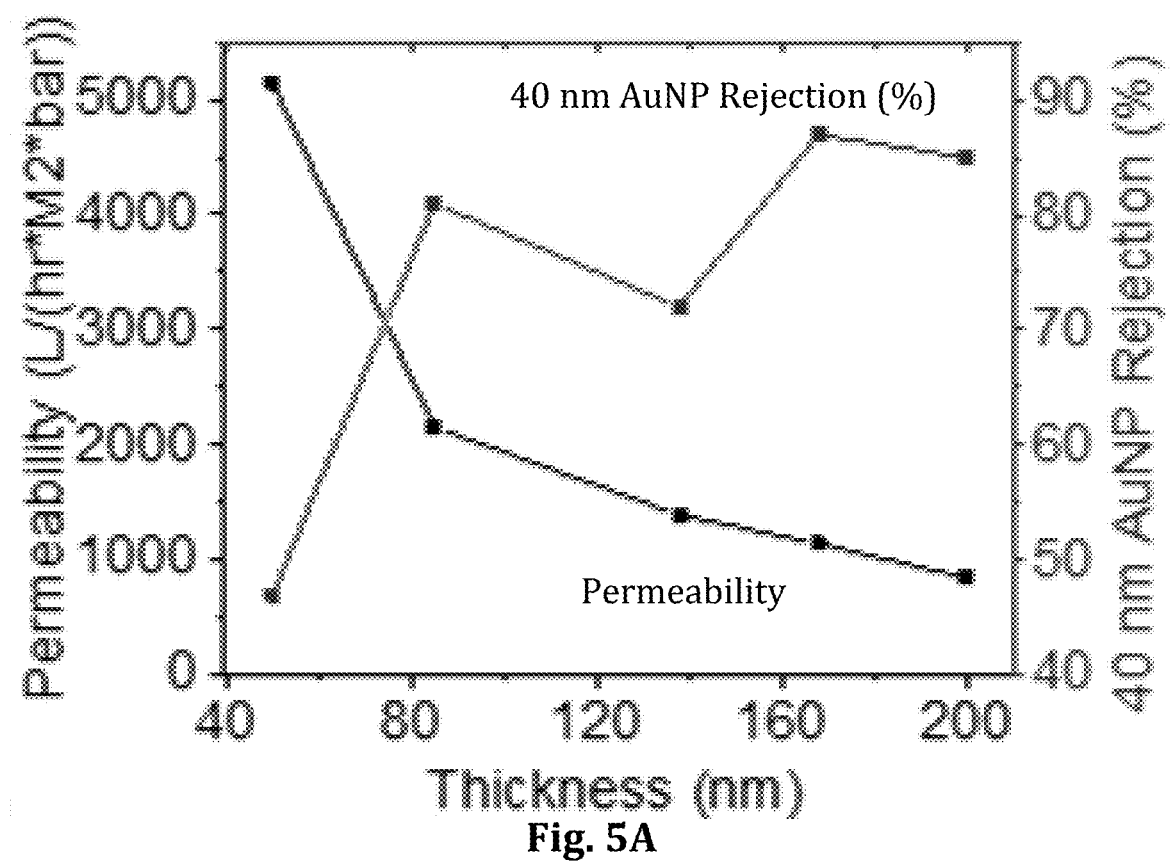

FIG. 5A shows selective layer thickness membrane performance in PS-b-PEO 110 kDa samples.

Figure 5B:
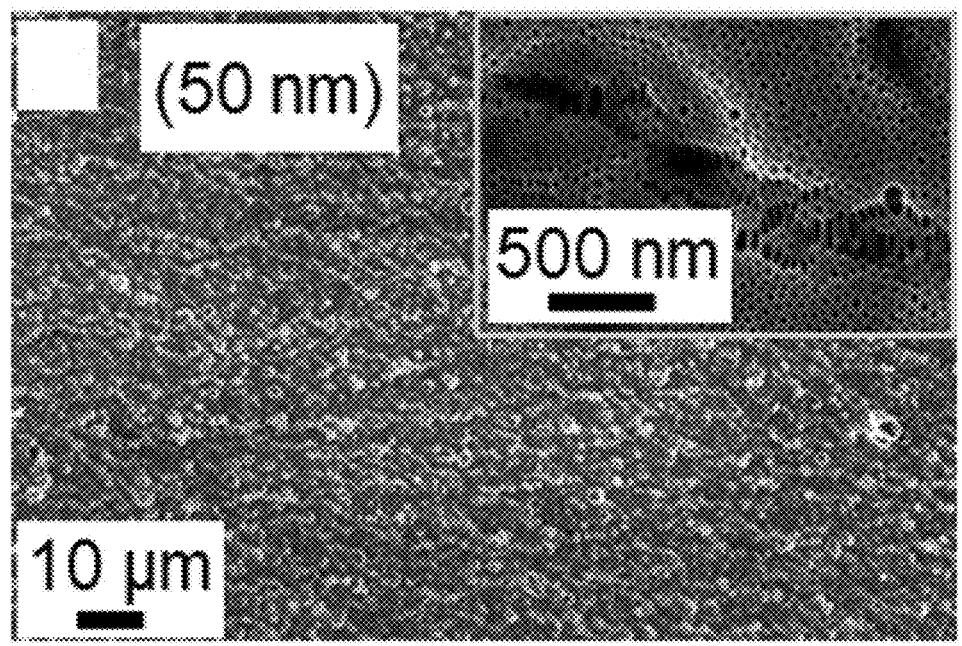

FIG. 5B shows craze formation for a 50 nm thick PS-b-PEO 110 kDa sample.

Figure 5C:
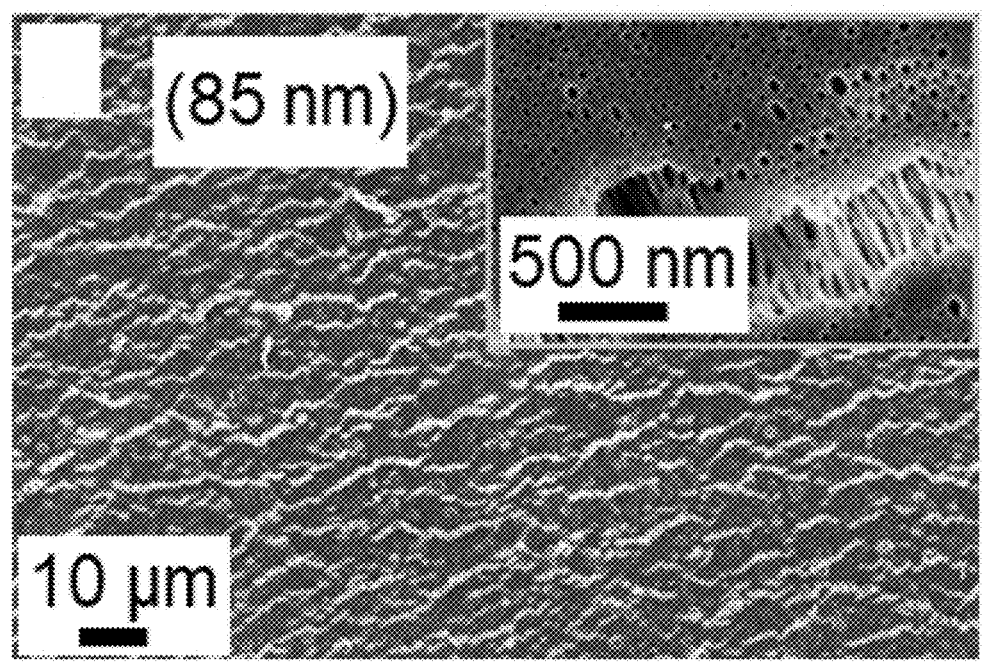

FIG. 5C shows craze formation for an 85 nm thick PS-b-PEO 110 kDa sample.

Figure 5D:
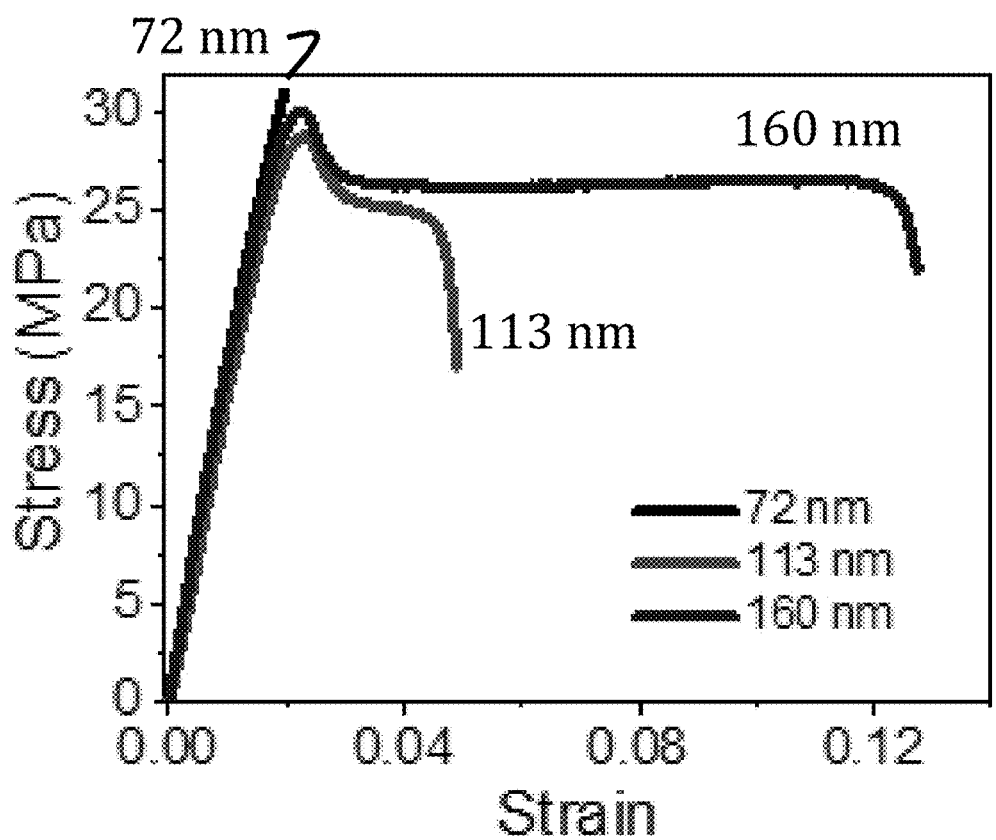

FIG. 5D shows tensile properties for 72 nm, 160 nm, and 113 nm thicknesses of PS-b-PEO 110 kDa samples.

Figure 5E:
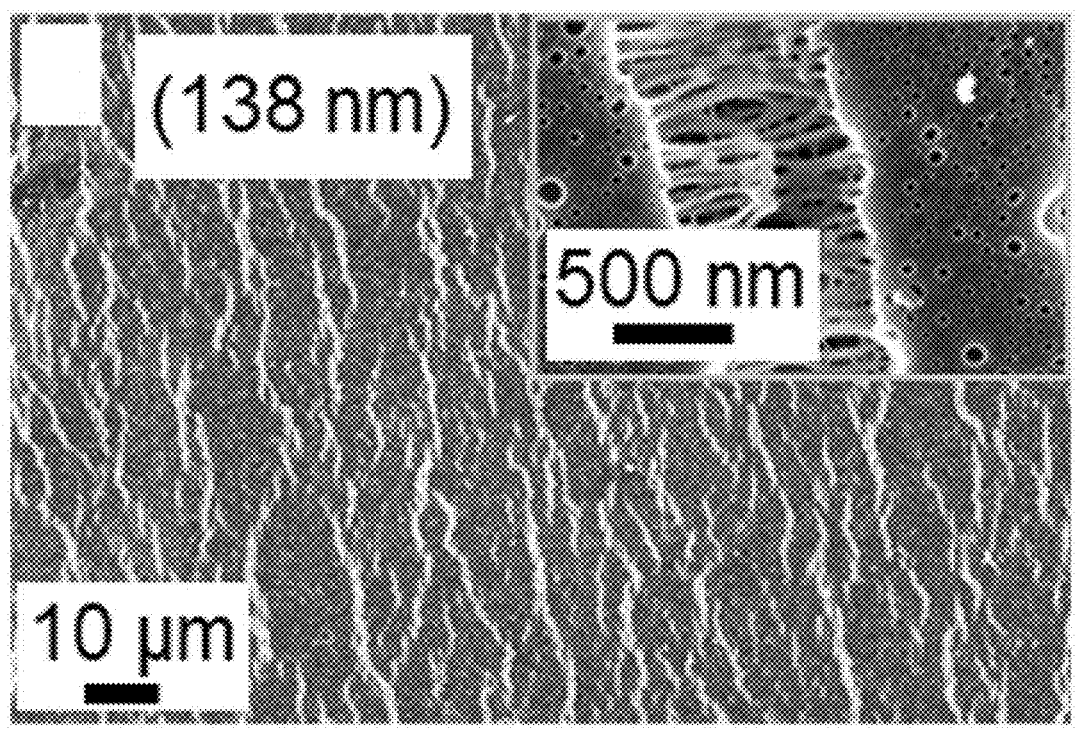

FIG. 5E shows craze formation for a 138 nm thick PS-b-PEO 110 kDa sample.

Figure 5F:
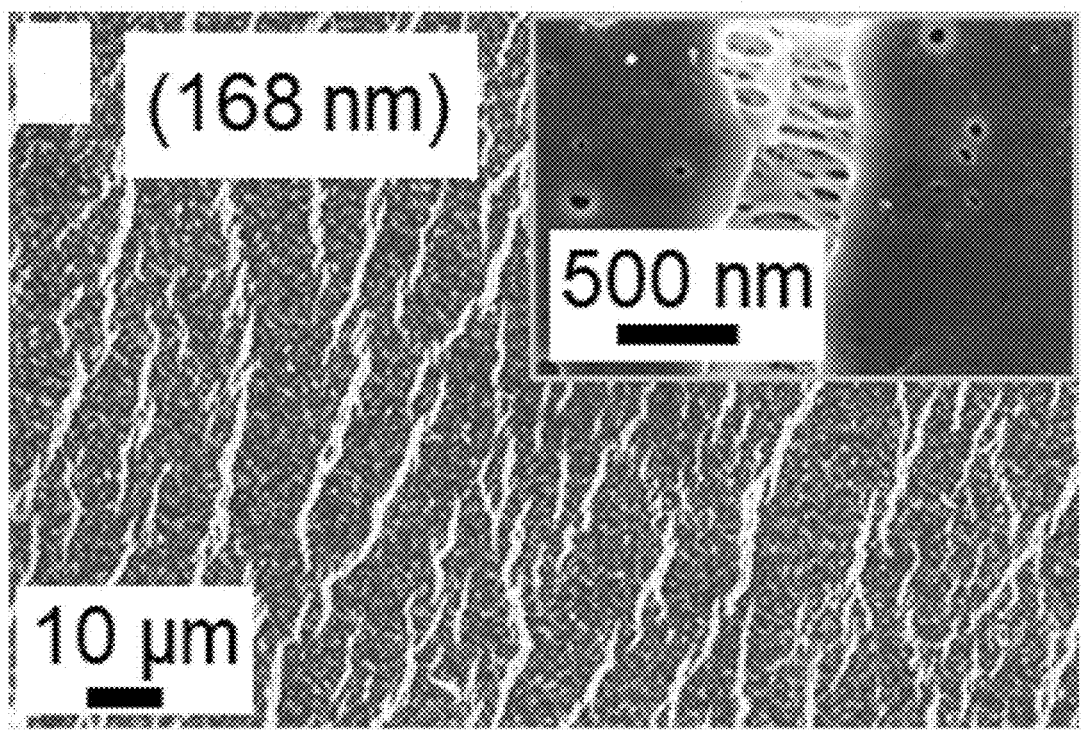

FIG. 5F shows craze formation for a 168 nm thick PS-b-PEO 110 kDa sample

Figure 6A:
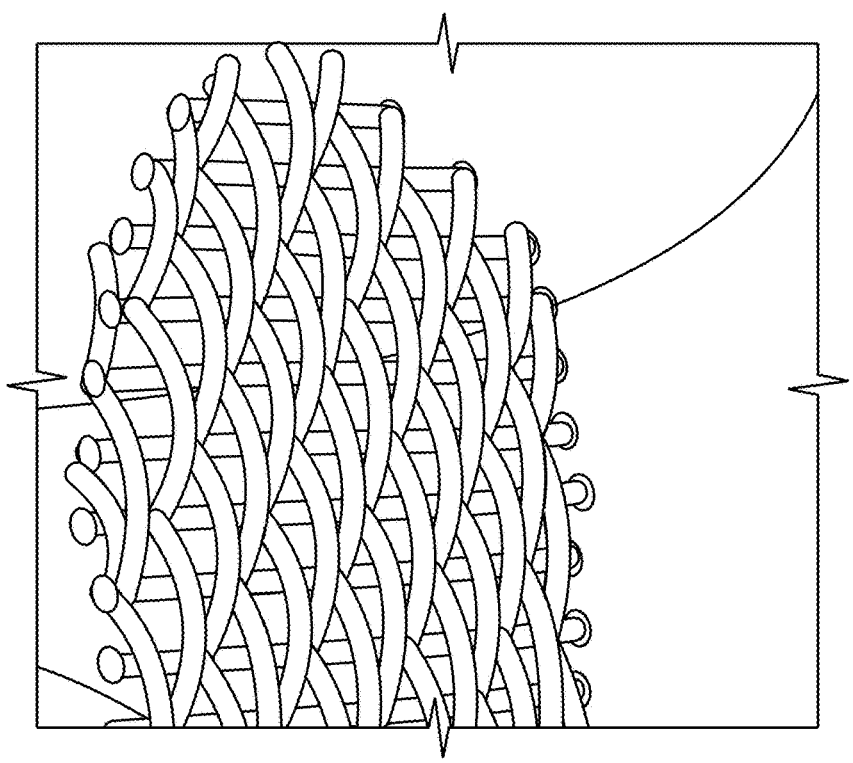
Figure 6B:
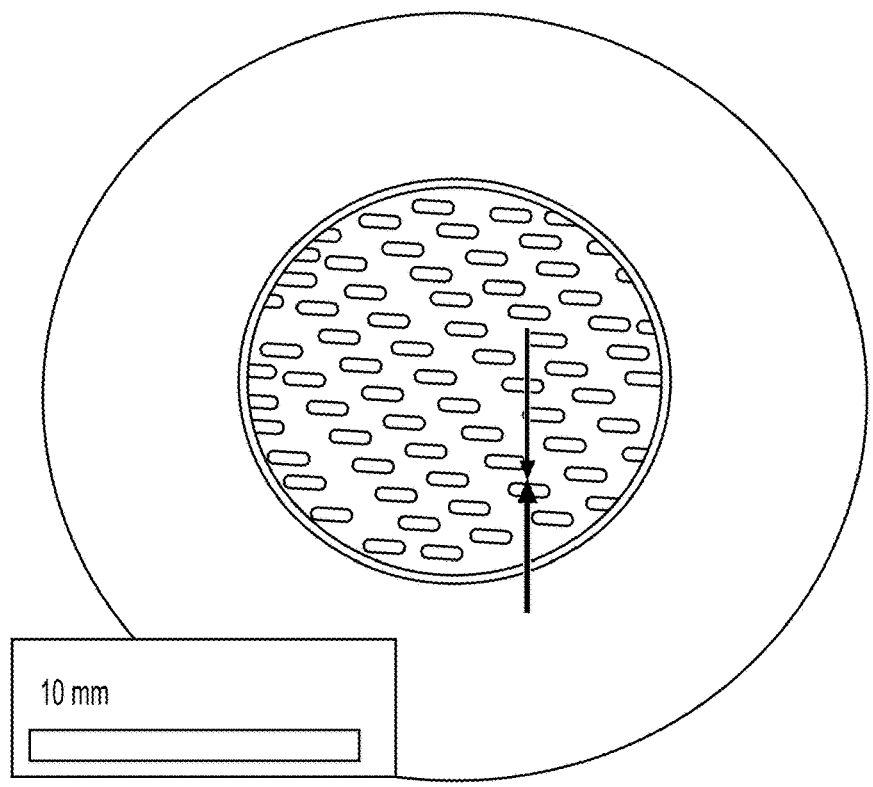
Figure 6C:
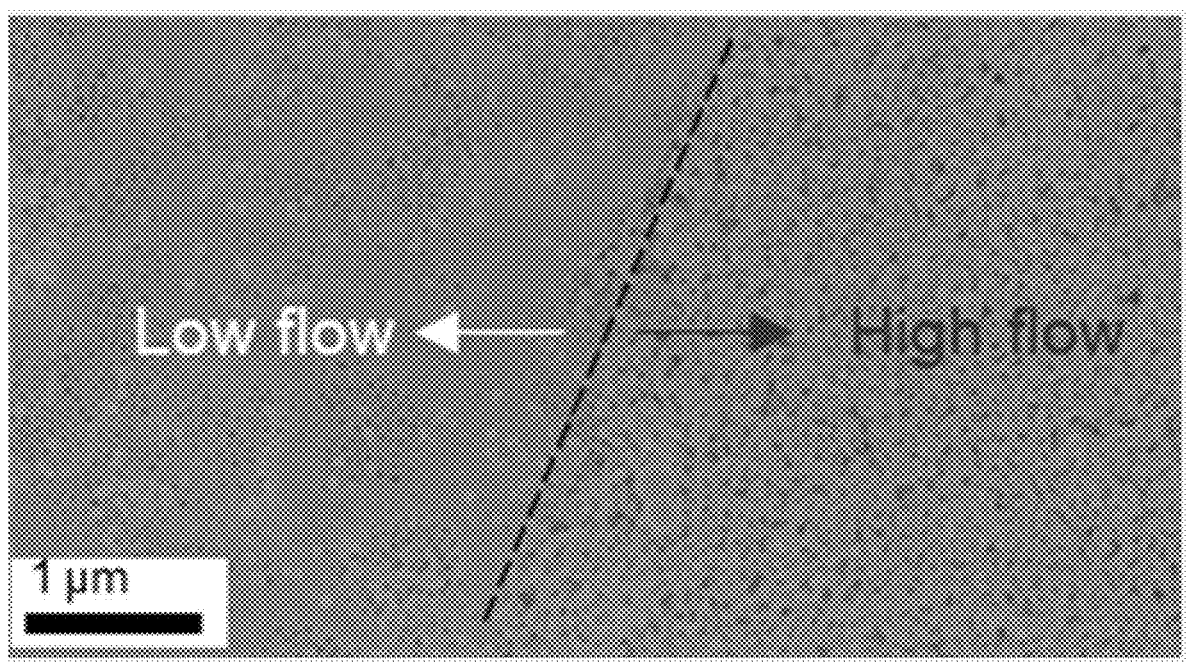

FIGS. 6A-6C show the effect of the spacer on a PS-b-PEO composite membrane.

FIG. 6A shows a mesh spacer.

FIG. 6B shows a composite membrane after filtration showing high flow in a pattern matching spacer.

FIG. 6C shows an SEM image of AuNP aggregation showing a sharp distinction between high and low flow areas.

Figure 7:
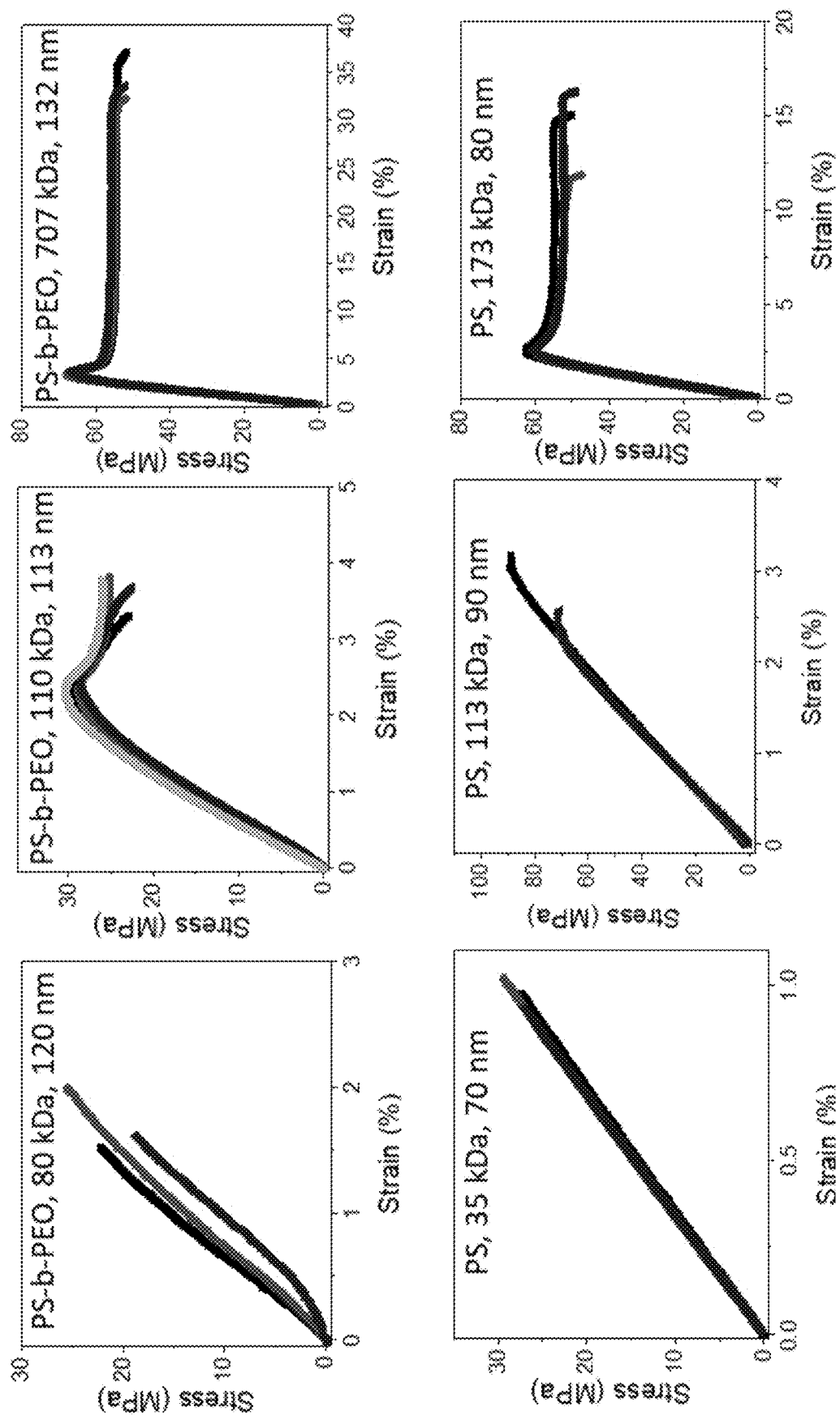
Figure 7:
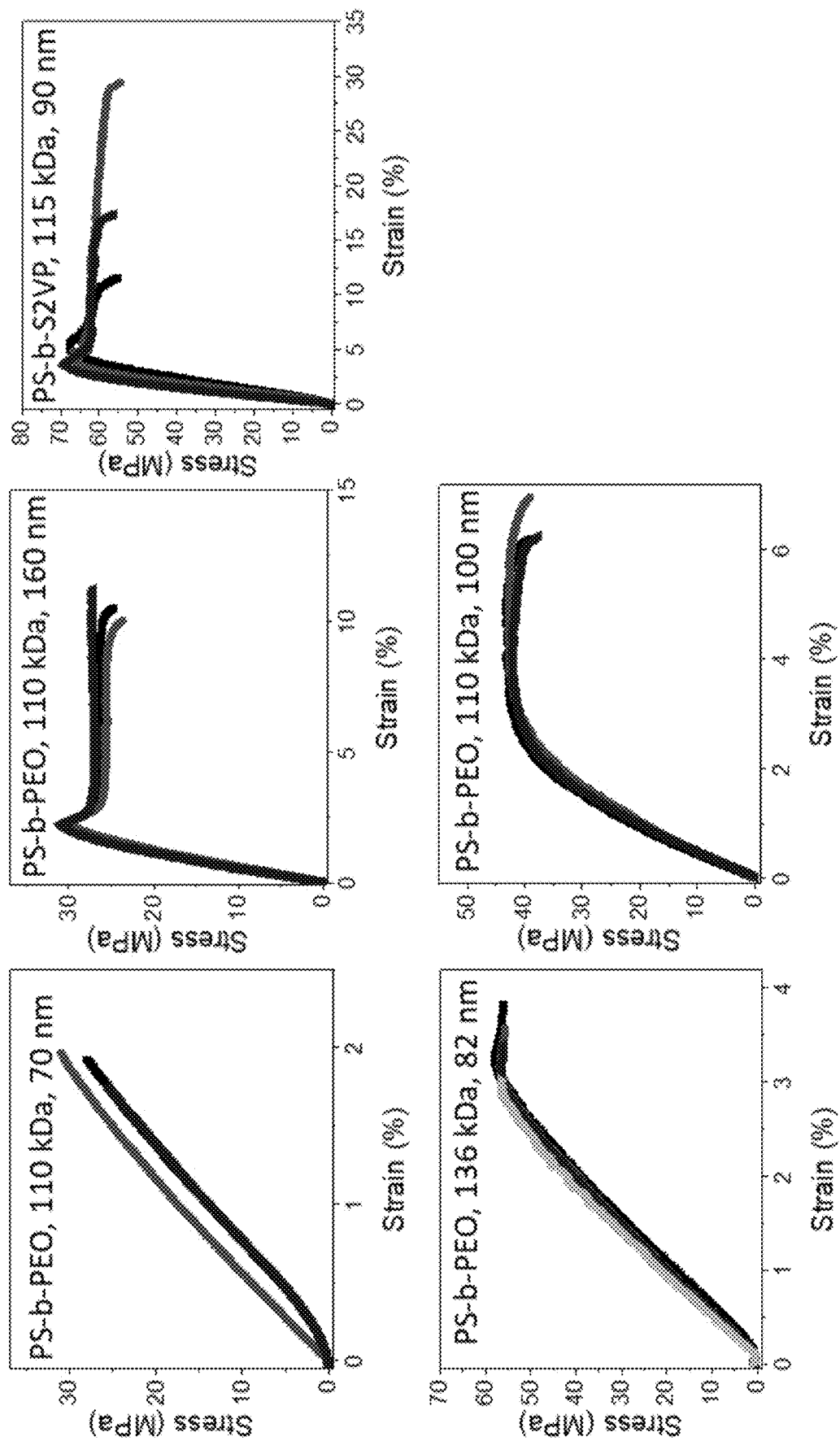

FIG. 7 shows the film-on water mechanical test data for each of the polymers. Each test was performed at least 3 times, as such, the three or more lines included the charts each represent different runs.

Figure 8:
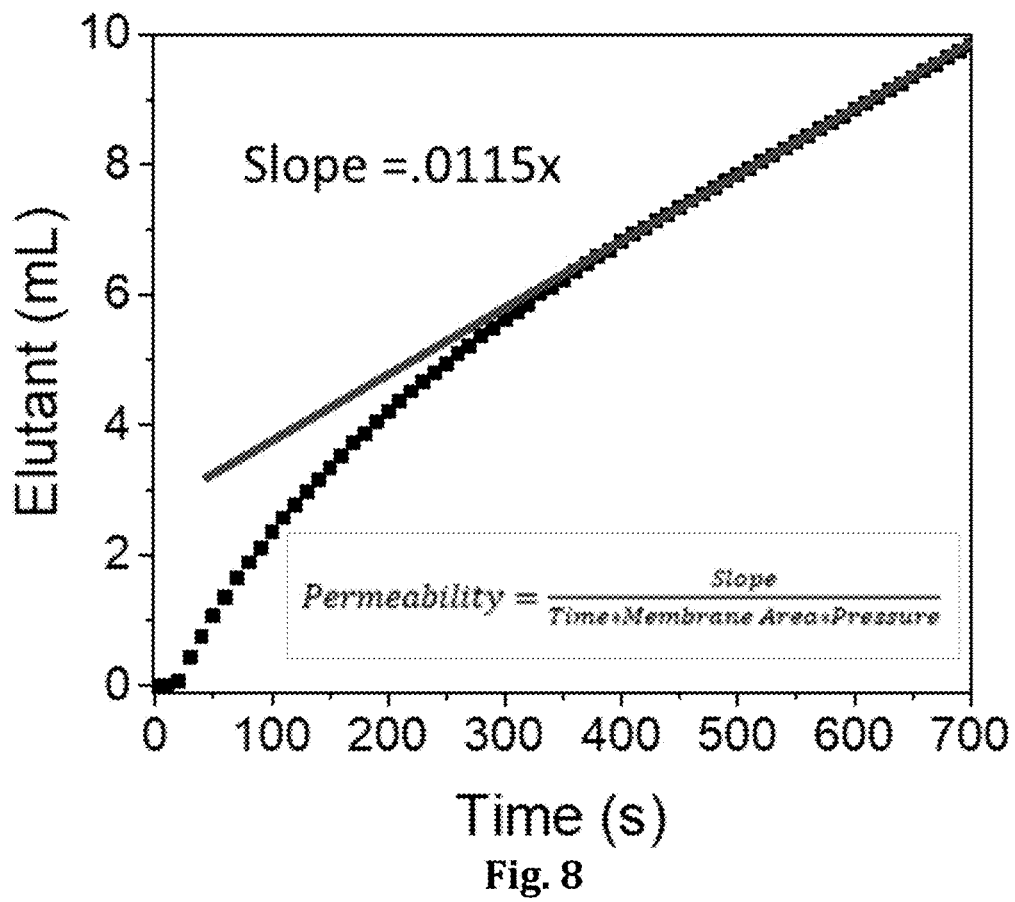

FIG. 8 is a representative example of how permeability was calculated. After an initialization period flux was linear with time. The slope at this linear portion of the graph was used to calculate permeability using the equation shown in FIG. 8.

Figure 9:
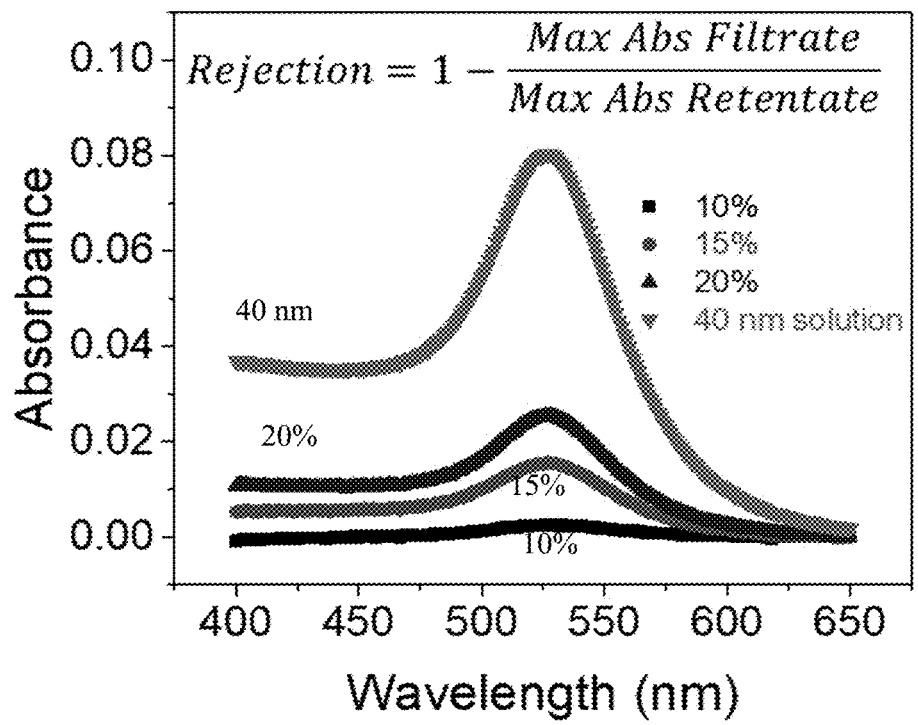

FIG. 9 is a representative example of how AuNP rejection was calculated. UV-Vis absorbance was monitored near AuNPs the absorption peak (530 nm) before and after filtration. The loss of intensity is directly related to loss of AuNP concentration, and the rejection was calculated using the equation shown in FIG. 9.

Figure 10:
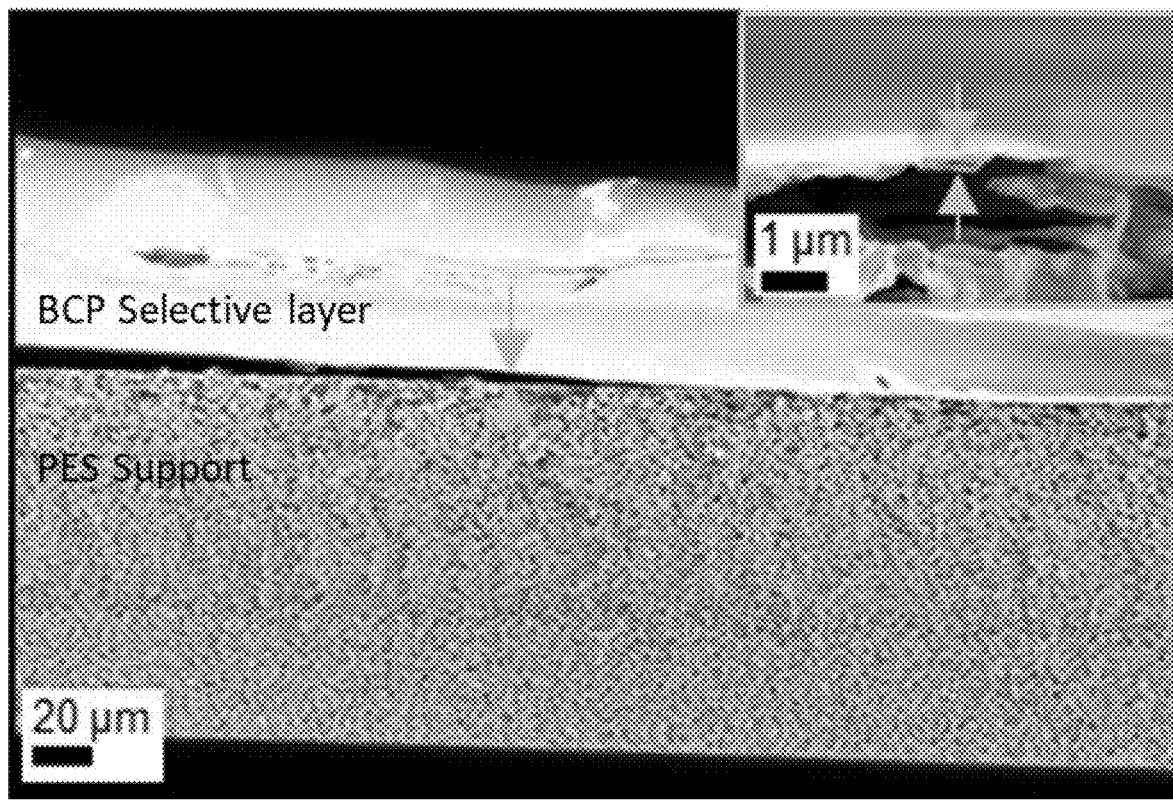

FIG. 10 shows an SEM image of a typical BCP composite membrane cross-section. The BCP layer was about 100 nm thick and had minimal infiltration into the PES support.

Figure 11:
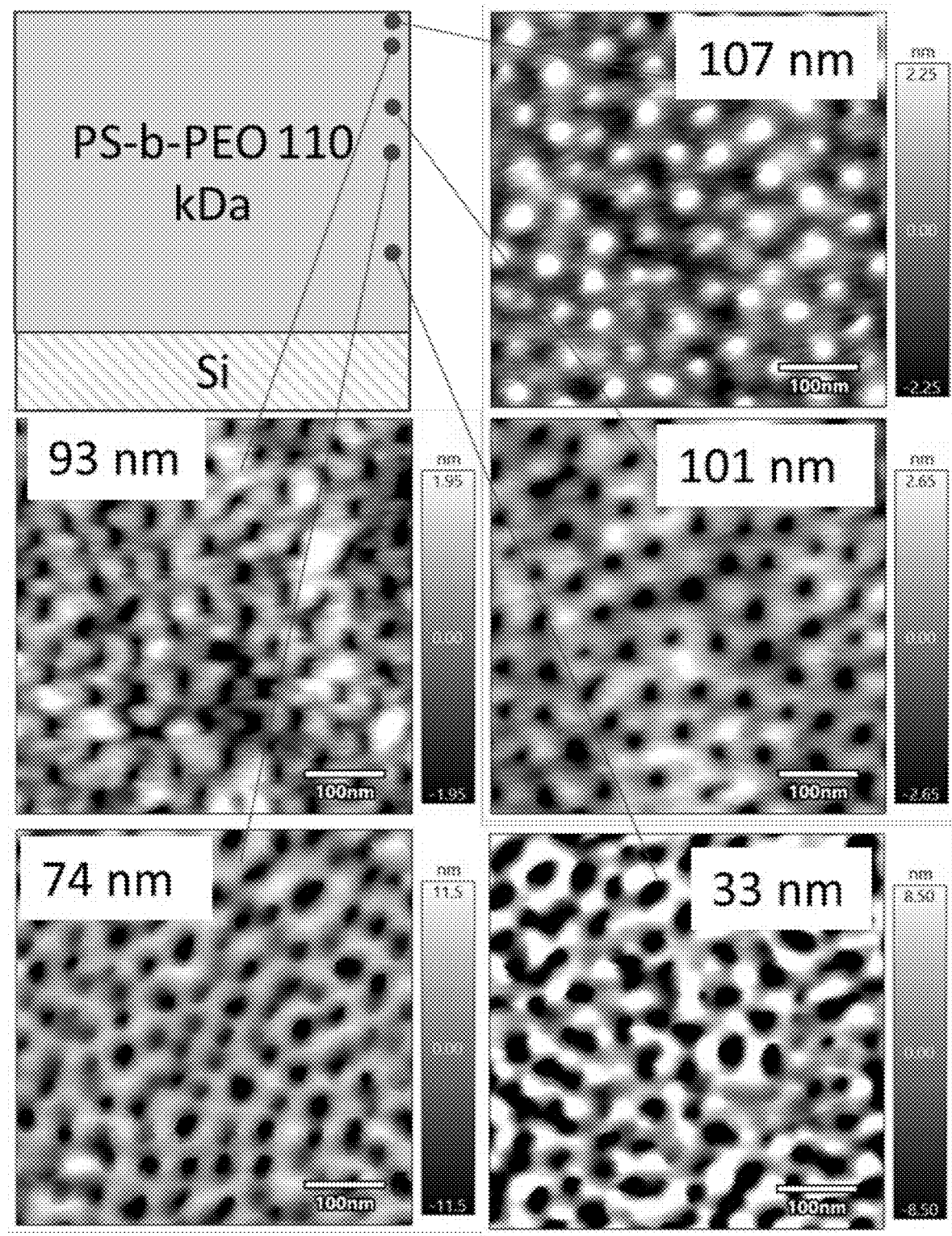

FIG. 11 shows PS-b-PEO 110 kDa morphologies at various oxygen plasma etching depths measured by Atomic Force Microscopy. All depths that were tested showed dot morphologies consistent with perpendicularly aligned columns. At deeper depths (33 nm) the morphology becomes partially mixed (dot and line morphologies).

Figure 12A:
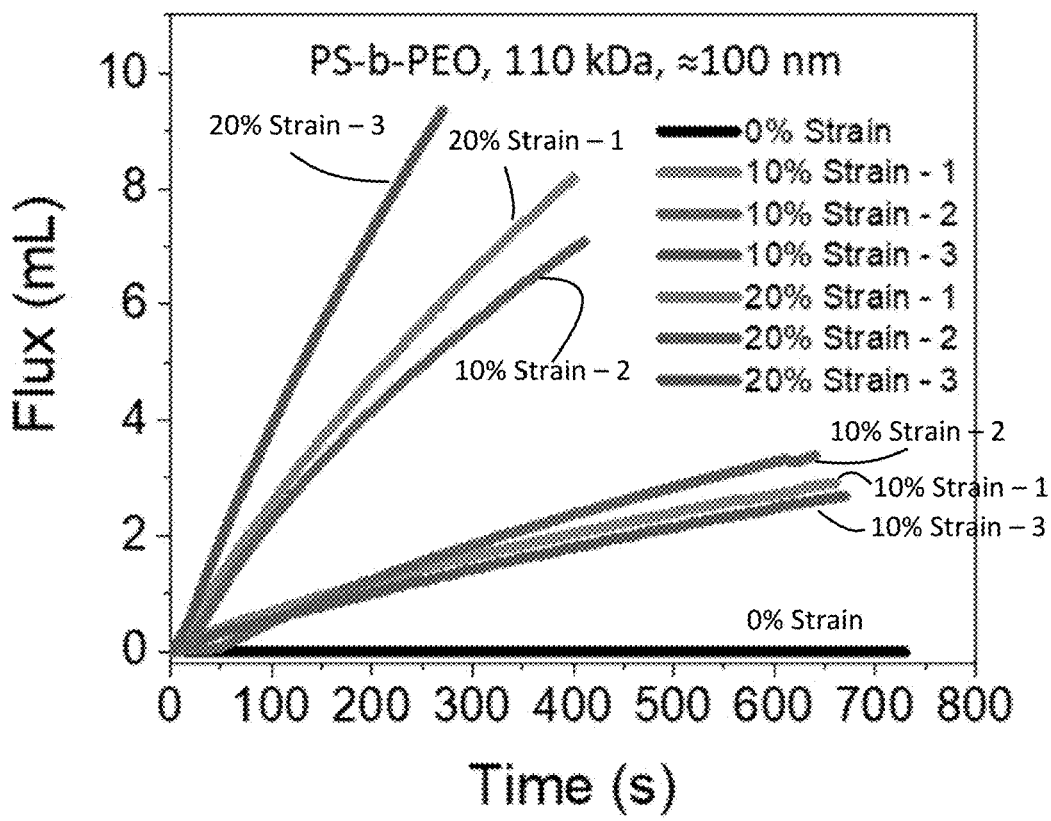
Figure 12B:
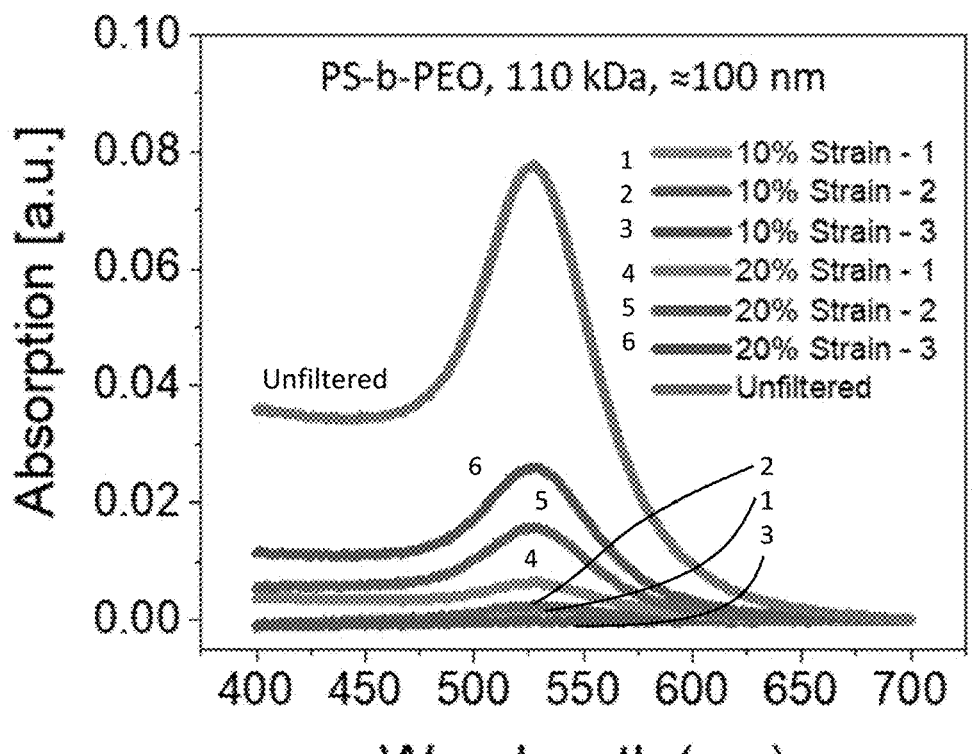

FIGS. 12A-12B show the raw filtration data for a stretched PS-b-PEO 110 kDa layer.

FIG. 12A shows clean water flux measurements for the stretched PS-b-PEO 110 kDa.

FIG. 12B shows UV-Vis absorbance spectra before and after filtration for a gold nanoparticle solution for the stretched PS-b-PEO 110 kDa.

Figure 13:
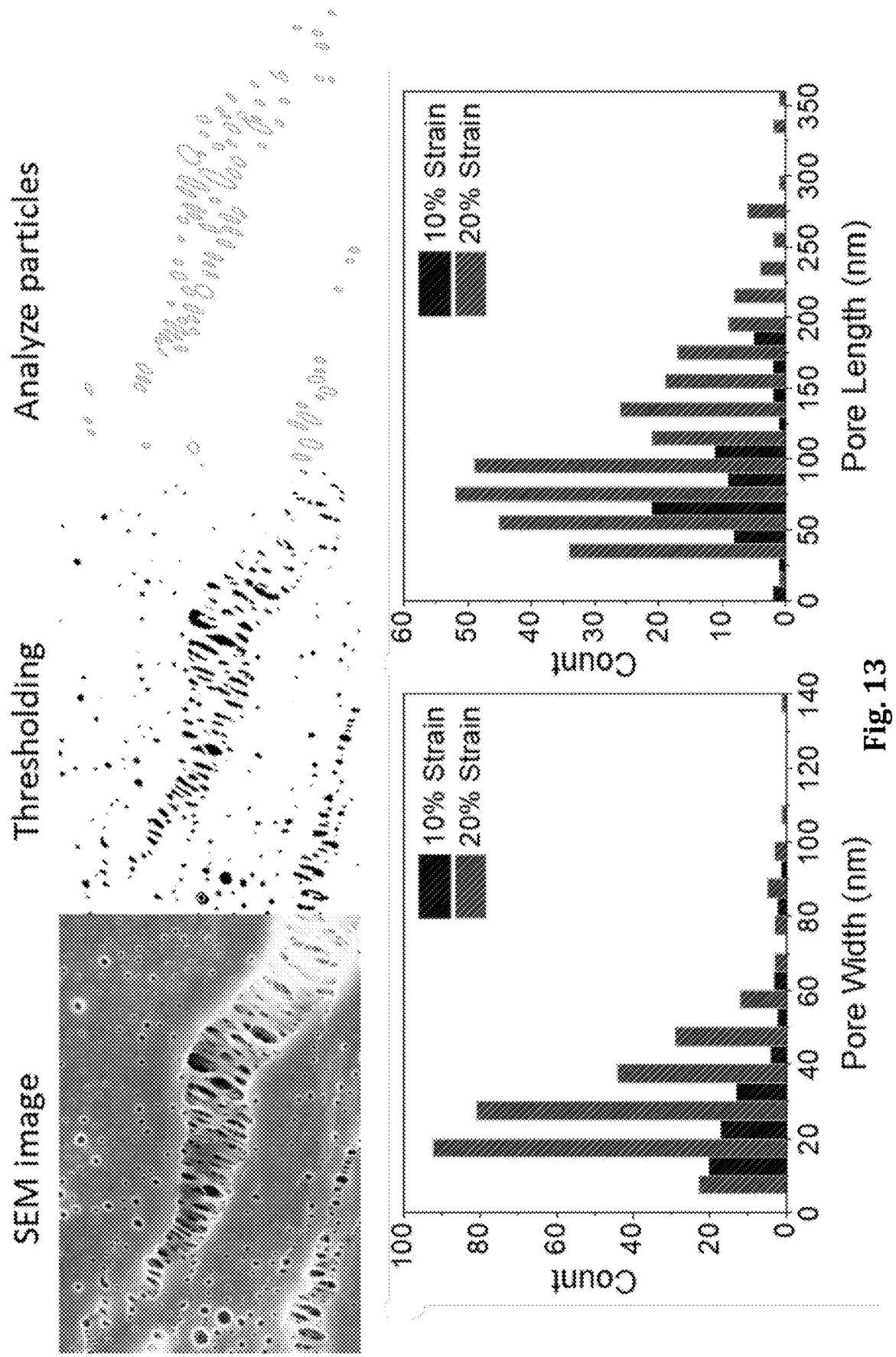

FIG. 13 shows an Image J pore size analyses of PS-b-PEO 110 kDa (≈100 nm) stretched to 10% and 20% strain. The top three images show an example of the Image J processing procedure. Thresholding was performed on the SEM image and then the particle analysis tool was used to fit ellipses to the dark areas. Only particles have an area >900 nm² with a circularity of <0.7 were considered for analysis to eliminate non-porous features. The bottom left chart shows the minor diameters (pore widths) of PS-b-PEO 110 kDa. The bottom right chart shows the major diameters (pore lengths) of the analyzed particles sorted into bins.

Figure 14:
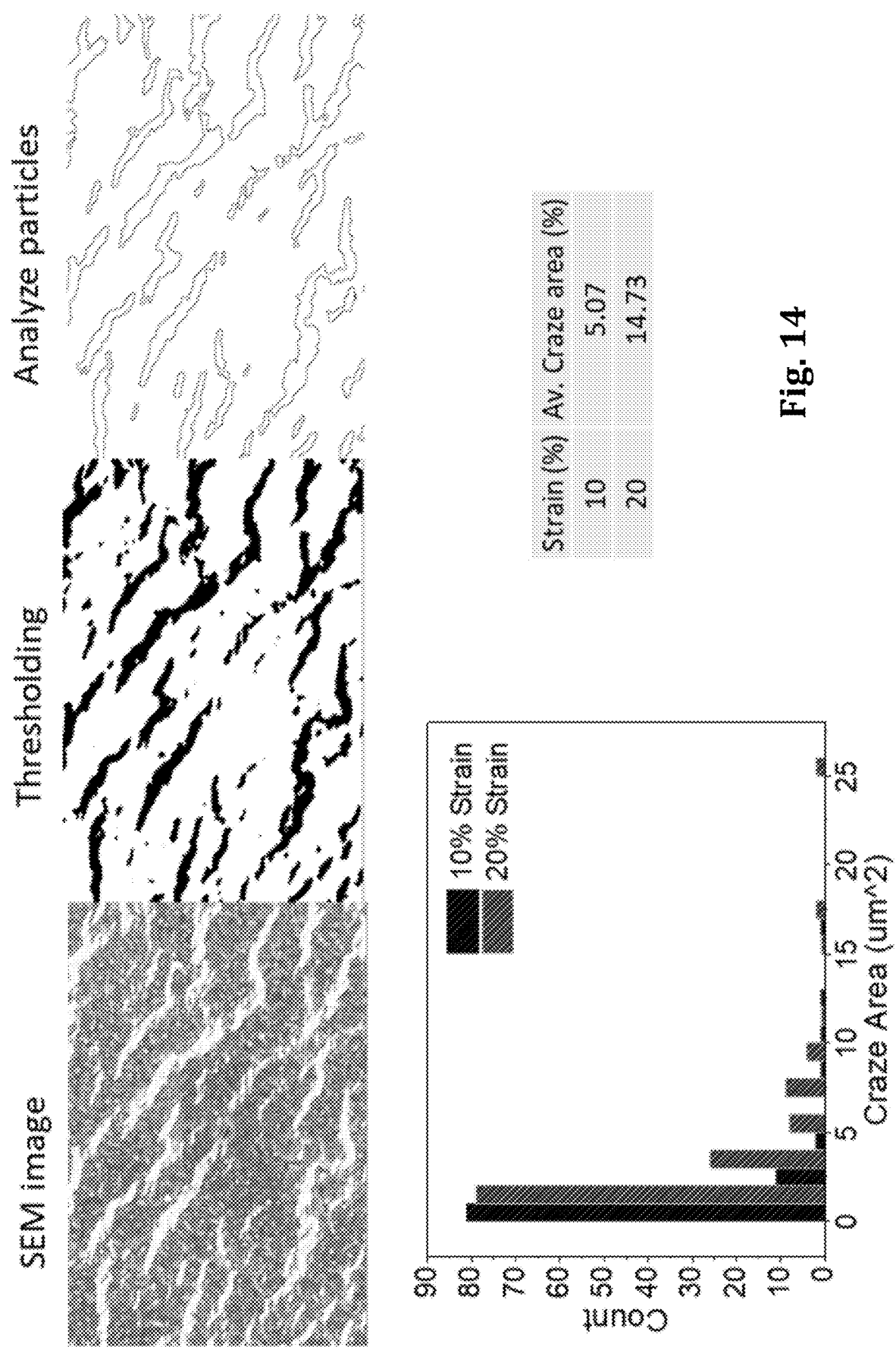

FIG. 14 shows an Image J craze size analyses of PS-b-PEO 110 kDa (≈100 nm) stretched to 10% and 20% strain. The top three images show an example of the Image J processing procedure. Thresholding was performed on the SEM image and then the particle analysis tool was used to calculate areas from the dark areas. The bottom left chart shows the craze area of the analyzed particles sorted into bins. The table shows the average craze area coverages.

Figure 15:
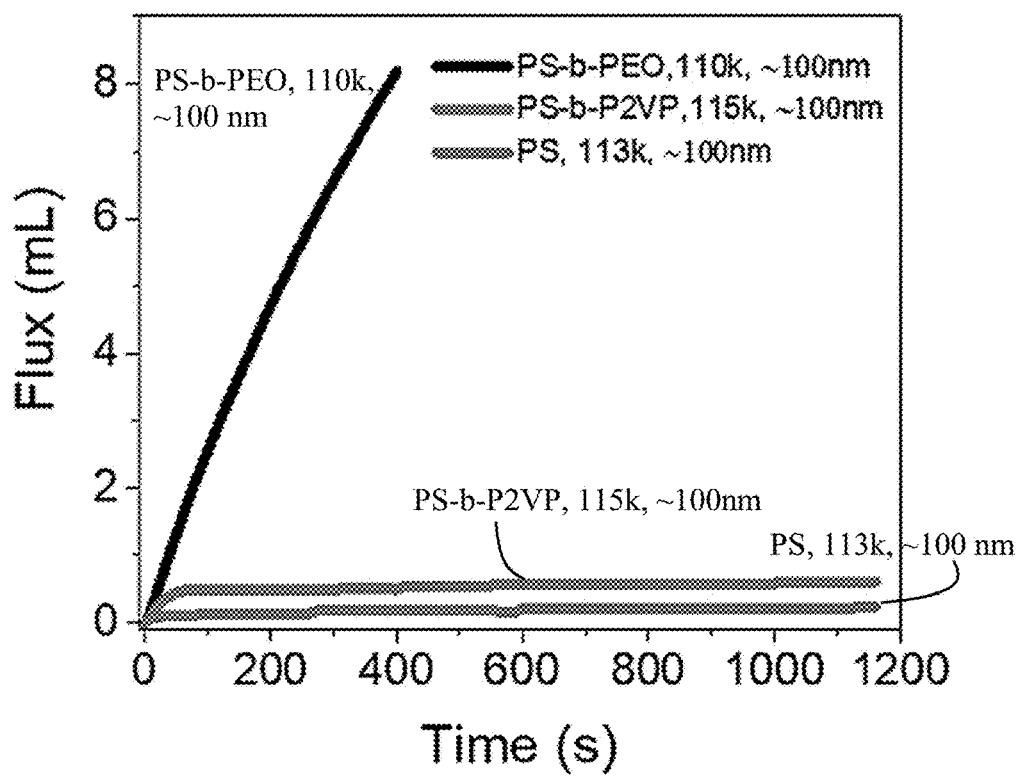

FIG. 15 shows the clean water flux of 3 composite membranes containing different selective layers after 20% strain. Only the sample with soft domains, i.e. PS-b-PEO, allowed flow.

Figure 16:
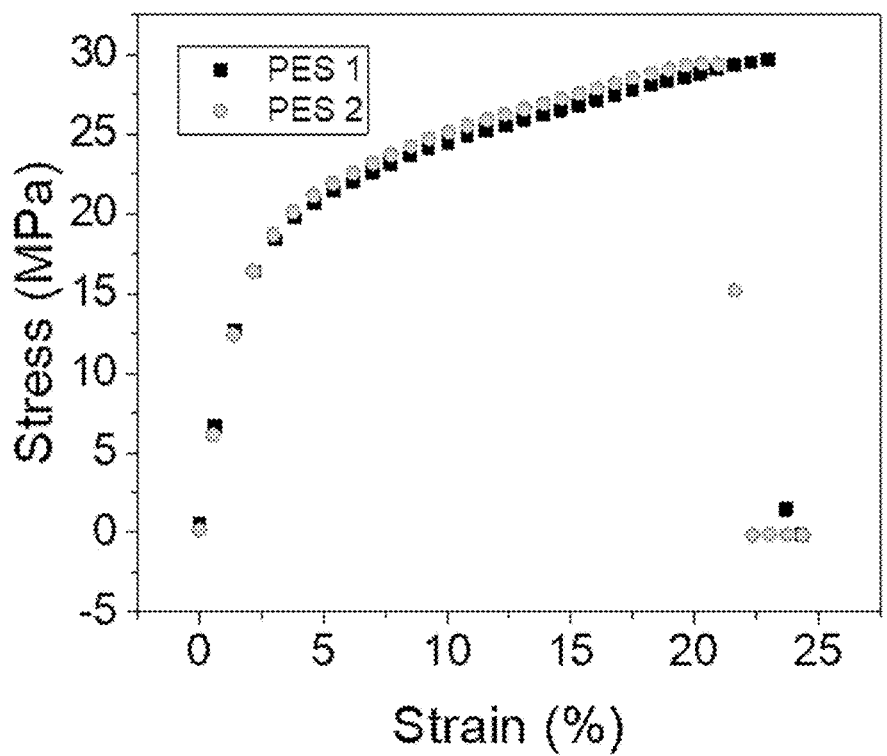

FIG. 16 shows stress-strain data for a bare PES support. Rupture occurred between 20-25% strain.

Figure 17A:
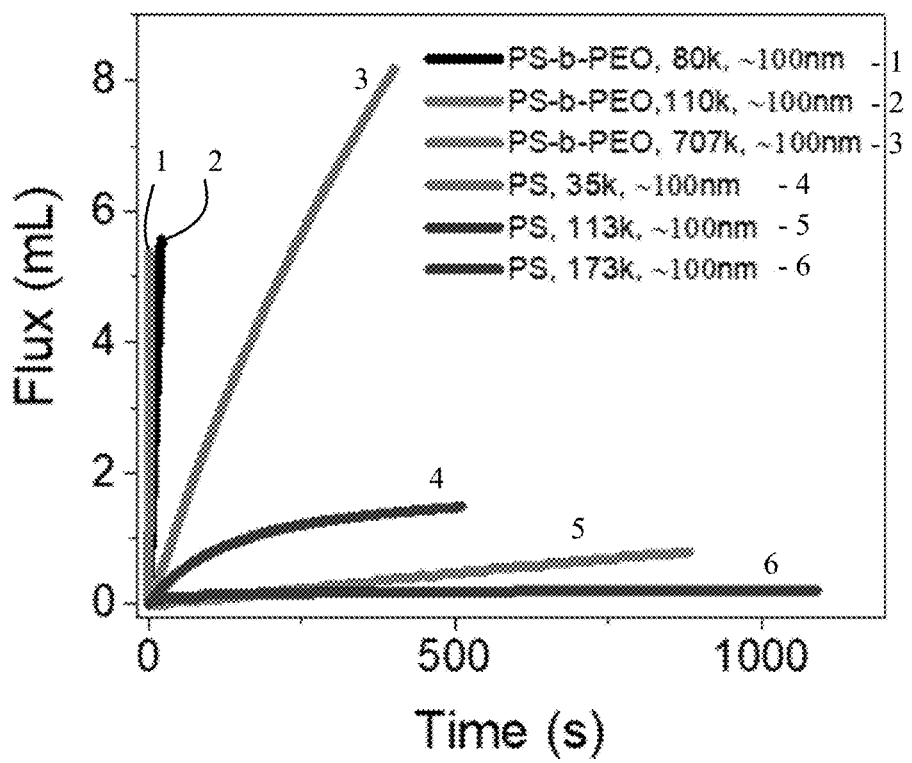

FIG. 17A shows raw clean water flux data for determining the effect that the Mn has on filtration performance. Filtration of PS 113 kDa was not possible due to insufficient flow.

Figure 17B:
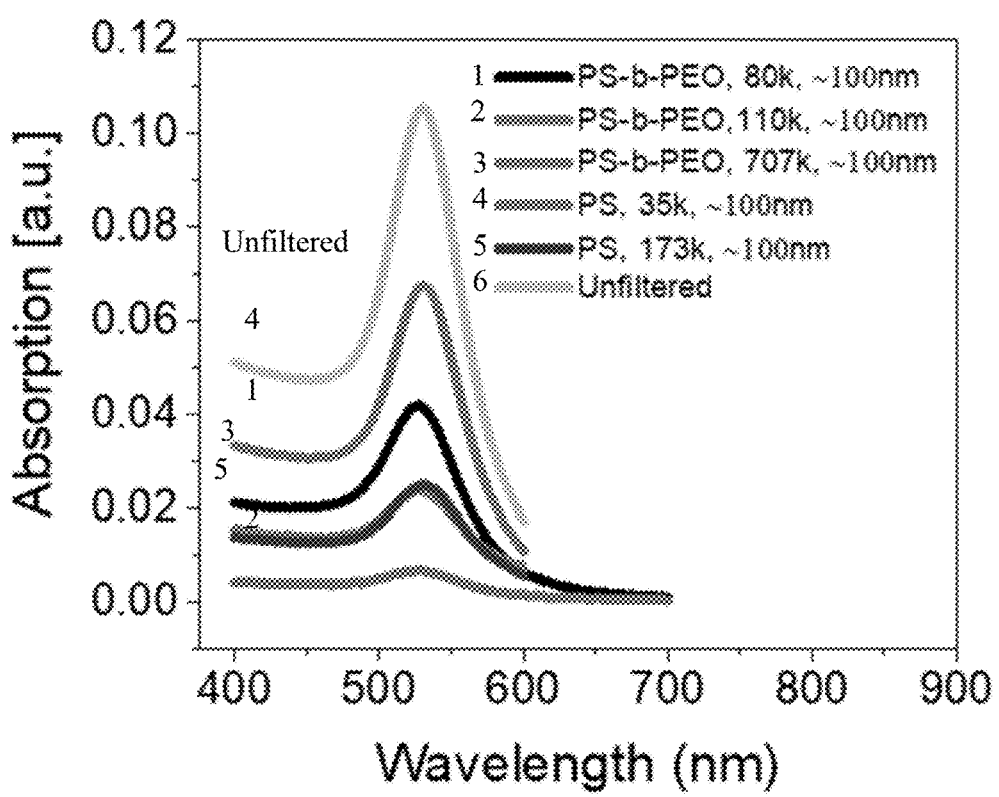

FIG. 17B shows UV-Vis data for determining the effect that the Mn has on filtration performance. Filtration of PS 113 kDa was not possible due to insufficient flow.

Figure 18A:
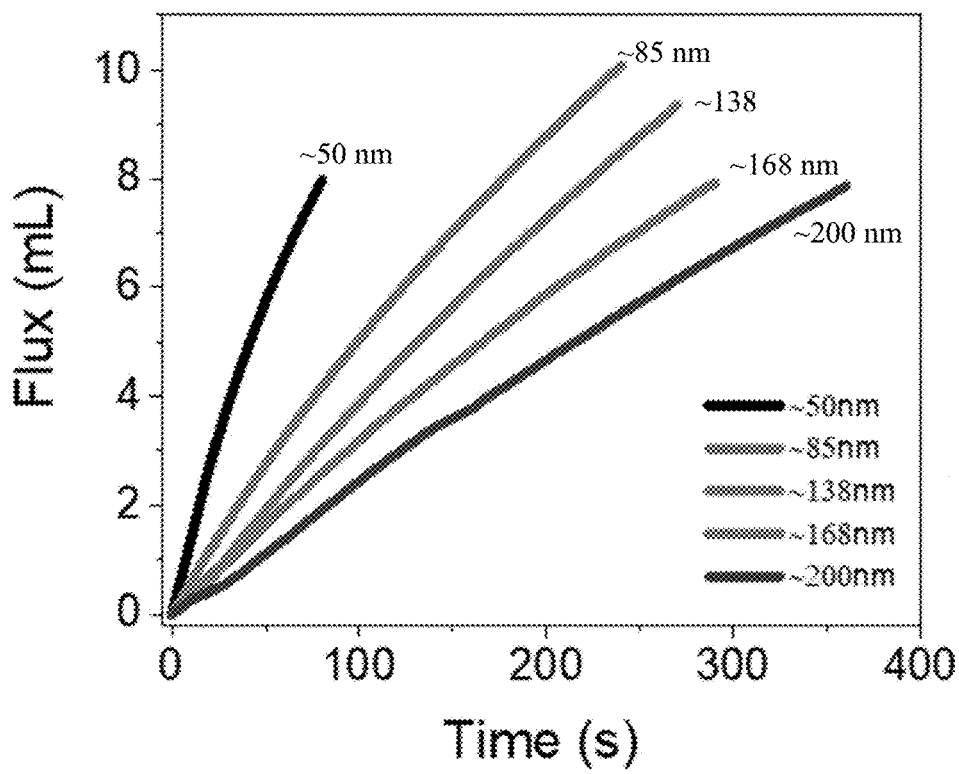

FIG. 18A shows raw clean water flux data for determining the effect that the thickness has on filtration performance for PS-b-PEO 110 kDa selective layers.

Figure 18B:
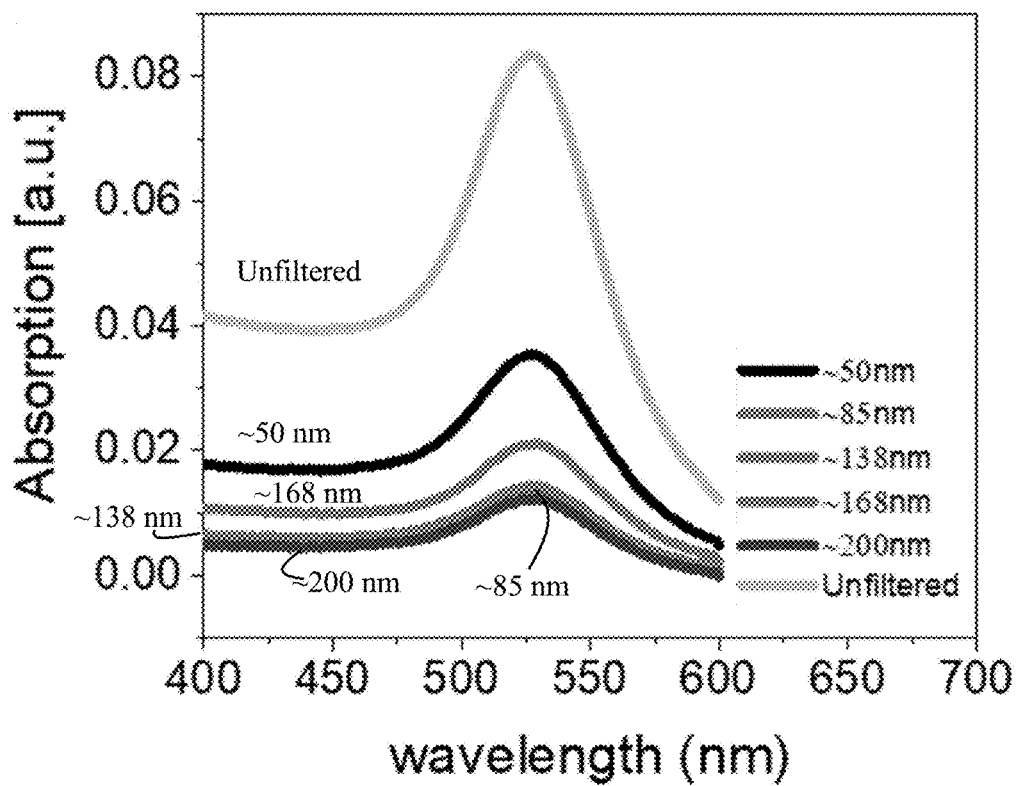

FIG. 18B shows UV-Vis data for determining the effect thickness has on filtration performance on PS-b-PEO 110 kDa selective layers.

Figure 19:
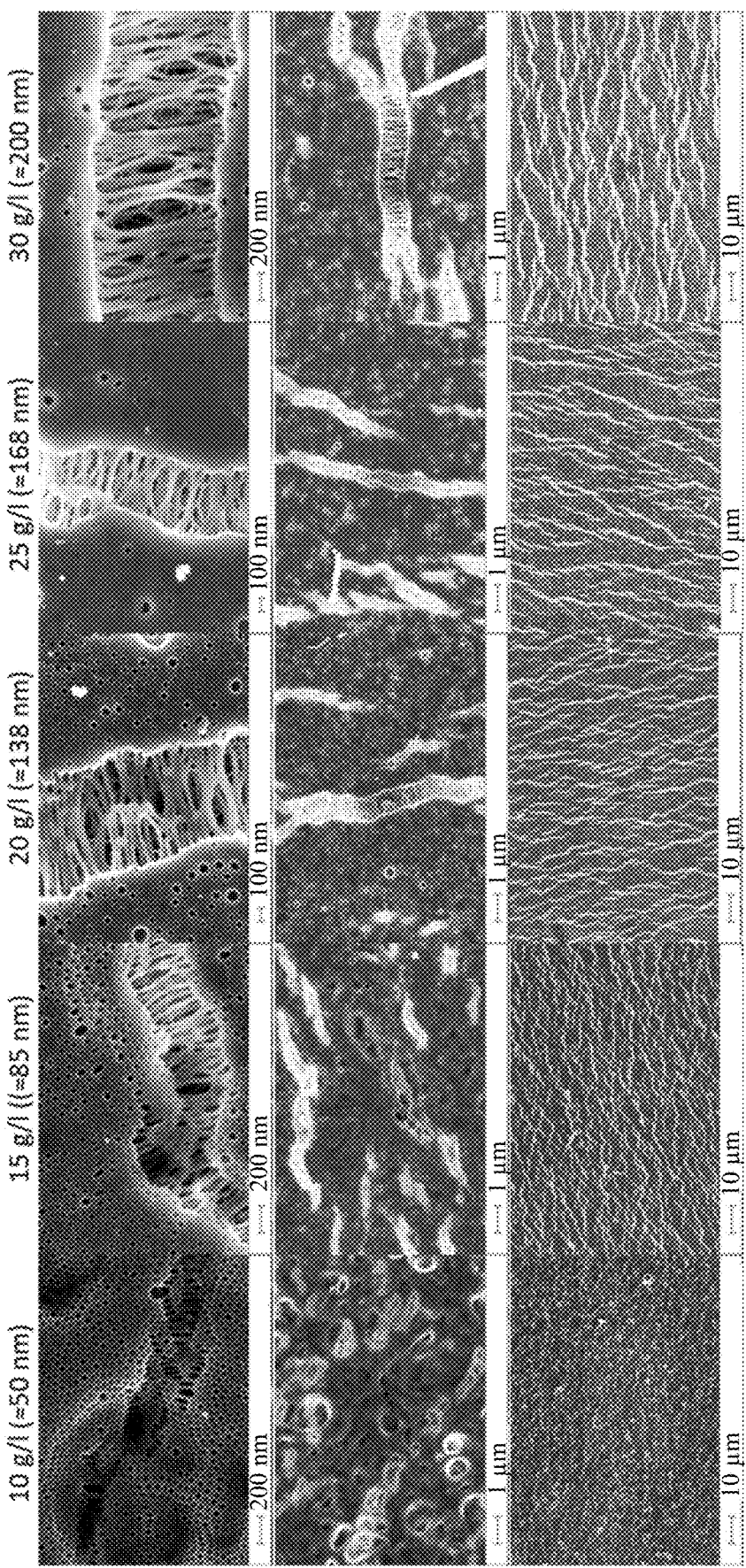

FIG. 19 shows the thickness effect on craze formation at 3 different size scales for PS-b-PEO 110 kDa.

Figure 20A:
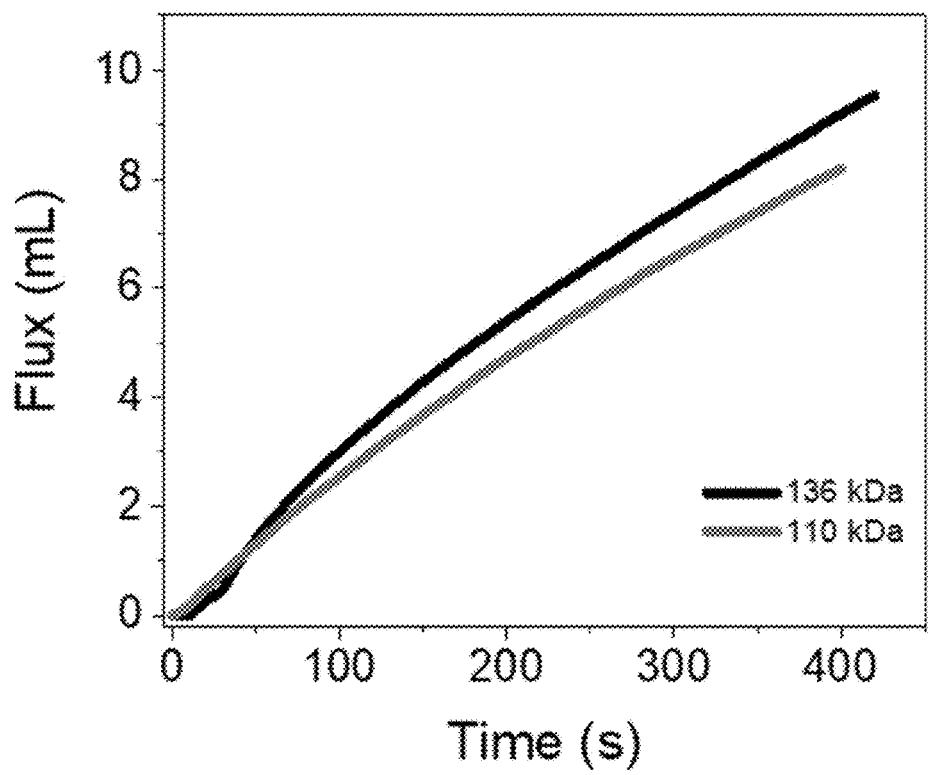

FIG. 20A shows the raw data for the comparison of purchased PS-b-PEO vs synthesized PS-b-PEO for clean water flux.

Figure 20B:
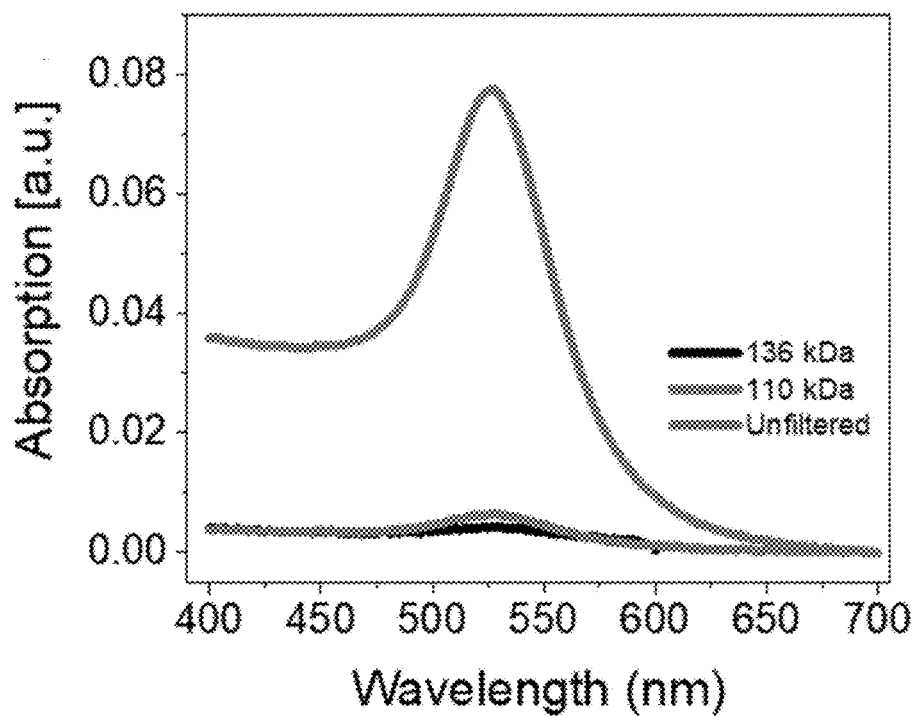

FIG. 20B shows raw data for the comparison of purchased PS-b-PEO vs synthesized PS-b-PEO for UV-Vis absorption.

Figure 21A:
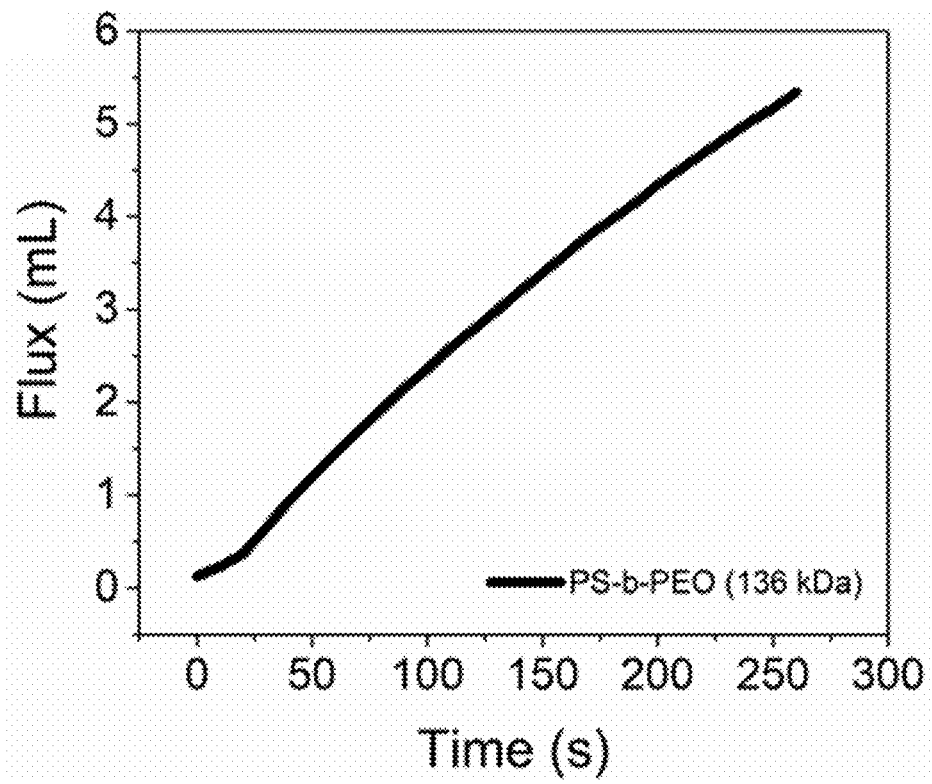

FIG. 21A shows raw data for filtration of bovine serum albumin (BSA) with a PS-b-PEO 136 kDa membrane stretched to 20% strain for clean water flux.

Figure 21B:
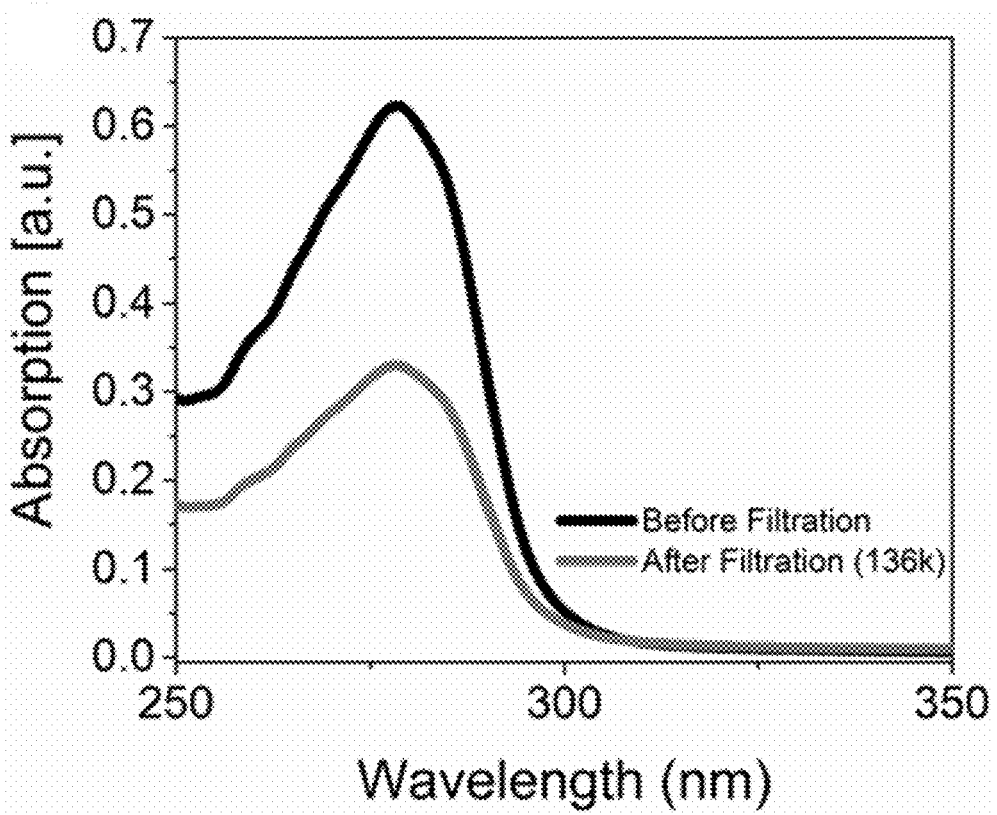

FIG. 21B shows raw data for filtration of BSA with a PS-b-PEO 136 kDa membrane stretched to 20% strain for UV-Vis absorption.

DETAILED DESCRIPTION OF THE INVENTION

The present disclosure relates to porous composite ultrafiltration membranes and methods of making them.

The porous composite ultrafiltration membranes of the present disclosure comprise a block copolymer layer and a macroporous substrate layer.

The block copolymer includes at least a soft block of polymer and a hard block of polymer.

The block copolymer layer may be formed by dissolving the block copolymer in a solvent, to form a 1-10 wt. % solution, in order to process block copolymer onto the macroporous substrate. Typically, the block copolymer may be deposited, by roll coating, spray coating, spin casting, or by slot die coating, onto the macroporous substrate layer to form the composite membrane. Spin casting may be carried out at rotational speeds of 500-10,000 rpm.

The composite membrane may optionally be dried. Preferably, the drying step is carried out at ambient conditions, i.e. at a temperature of from about 20° C. to about 25° C.

Finally, tensile strain is applied to the composite membrane to form the porous composite ultrafiltration membrane. The application of tensile strain causes cavitation, which results in the formation of nanoscale pores from block copolymer templates in the membrane. The composite membrane may be stretched by about 1% to about 20%, or from about 5% to about 15%, or about 10%, based on the original dimension of the composite membrane to form the porous composite ultrafiltration membrane. This stretching may be uniaxial or biaxial stretching.

The porous composite ultrafiltration membrane preferably has a pore width of less than 40 nm, or no greater than 30 nm, or no greater than 15 nm, or from about 1 nm to about 10 nm, and has a pore length of, for example 150 nm to 1000 nm as measured by electron microscopy.

The porous composite ultrafiltration membrane of the present disclosure is preferably devoid of one or more random copolymers. When a membrane with random copolymers is subjected to tensile strain, such as by stretching, a weak initiation point will form and continue to grow. As such, the presence of a random polymer is likely to form cracks or large holes, rather than the desired nanosized pores.

In contrast, the block copolymer layer of the invention that is devoid of random polymers, allows for the formation of a template with a curated distribution of soft block polymers and hard block polymers. Accordingly, when tensile strain is applied to the block copolymer layer, such as by stretching, the soft block polymer will deform and cavitate to form pores. The resulting membrane includes a uniform distribution of the desired sized nanoscale pores.

Block Copolymer Layer

The porous composite ultrafiltration membrane of the present disclosure includes a block copolymer layer. The block copolymer layer may include one or more soft block polymer(s) and one or more hard block polymer(s) covalently bonded to each other. The block copolymer layer may have a thickness of greater than 50 nm, or greater than 70 nm, or from about 50 nm to about 1 µm, or from about 50 nm to about 500 nm, or from about 70 nm to about 300 nm, or from about 140 nm to about 200 nm.

The total amount of soft block polymer present in the block copolymer layer may be from about 5% by volume to less than 50% by volume, or from about 10% by volume to about 40% by volume, or from about 15% by volume to about 30% by volume, or greater than 5% by volume, or greater than 10% by volume, or greater than 15% by volume, or less than 50% by volume, or less than 40% by volume, or less than 30% by volume, based on the total volume of the block copolymer. Preferably, the block copolymer layer does not comprise more than 50%, or more than 40% by volume of the soft block polymer as this will cause the entire block copolymer layer to deform upon stretching.

Suitable examples of the one or more soft block polymer(s) may include, but are not limited to, polystyrene-block-polyethylene (oxide) (PS-PEO), polystyrene-block-poly(4-vinylpyridine) (PS-P4VP), polystyrene-block-poly(2-vinylpyridine) (PS-P2VP), polystyrene-b-poly(methyl methacrylate) (PS-PMMA), and polystyrene-block-polylactide (PS-PLA). Preferably, the one or more soft block polymer(s) comprises a polyethylene (oxide) block polymer.

The one or more soft block polymers may have a number average molecular weight of from about 1,000 g/mol to about 75,000 g/mol, or from greater than 10,000 g/mol to about less than 50,000 g/mol, or from about 20,000 g/mol to about 45,000 g/mol, as measured by gel permeation chromatography. For example, the one or more soft block polymer may comprise of a polyethylene (oxide) block polymer having a number average molecular weight of from about 1,000 g/mol to about 75,000 g/mol, or from greater than 10,000 g/mol to about less than 50,000 g/mol, or from about 20,000 g/mol to about 45,000 g/mol, as measured by gel permeation chromatography.

The one or more soft block polymer(s) may have an elongation at break of greater than 50%, or greater than 100%, or greater than 150%, or greater than 200%, as measured by ASTM D638. The one or more soft block polymer(s) may have an elastic modulus of between 10 MPa to 3 GPa as measured by the ASTM D638 tensile test.

The total amount of hard block polymer present in the block copolymer layer may be greater than 50% by volume to less than 95% by volume, or from about 60% by volume to less than 90% by volume, or from about 70% by volume to about 85% by volume, or greater than 50% by volume, or greater than 60% by volume, or greater than 70% by volume, or less than 95% by volume, or less than 90% by volume, or less than 85% by volume, based on the total volume of the block copolymer layer.

Suitable examples of the one or more hard block polymer(s) may include, but are not limited to a polystyrene block polymer, a polymethacrylate block polymer, a poly (methyl methacrylate) block polymer, a polyvinylpyridine block polymer, a polyvinylcyclohexane block polymer, a polyimide block polymer, a polyamide block polymer, a polypropylene block polymer, a poly (2,6-dimethyl-1,4-phenylene oxide) block polymer, a polyolefin block polymer, a poly (t-butyl vinyl ether) block polymer, a poly (cyclohexyl methacrylate) block polymer, a poly (cyclohexyl vinyl ether) block polymer, poly (t-butyl vinyl ether) block polymer, polyethylene block polymer, polyvinylidene fluoride block polymer, and mixtures thereof. Preferably, the one or more hard block polymer(s) is selected from a polystyrene block polymer, a poly(2-vinylpyridine) block polymer, even more preferably, the one or more hard block polymer(s) comprise a polystyrene block polymer.

The one or more hard block polymer(s) may have an elongation at break of less than 30%, as measured by ASTM D638. The one or more hard block polymer(s) may have an elastic modulus of higher than 1 GPa as measured by the ASTM D638 tensile test.

The one or more hard block polymer(s) may include two or more hard block polymers, or three or more hard block polymers.

The one or more hard block polymers may have a number average molecular weight of from about 10,000 g/mol to about 500,000 g/mol, or from greater than 35,000 g/mol to about less than 170,000 g/mol, or from about 50,000 g/mol to about 150,000 g/mol, or from greater than 80,000 g/mol to about 150,000 g/mol, as measured by gel permeation chromatography. For example, the one or more hard block polymer(s) may comprise a poly(styrene) block polymer having a number average molecular weight of from about 10,000 g/mol to about 500,000 g/mol, or from greater than 35,000 g/mol to about less than 170,000 g/mol, or from about 50,000 g/mol to about 150,000 g/mol, or from greater than 80,000 g/mol to about 150,000 g/mol, as measured by gel permeation chromatography.

In one embodiment, the block copolymer layer may comprise a poly(styrene) hard block polymer and a poly (ethylene oxide) soft block polymer.

Macroporous Substrate Layer

The porous composite ultrafiltration membrane of the present disclosure includes a macroporous substrate layer. The macroporous substrate layer provides mechanical support to the block copolymer layer. This allows for a reduced thickness of the block copolymer layer by providing the required mechanical strength of the membrane via the relatively inexpensive macroporous substrate later, while maintaining the desirable ultrafiltration characteristics. The macroporous substrate is preferably completely saturated with water. Prior to depositing the block copolymer layer onto the macroporous substrate, the macroporous substrate may be infused with water. Preferably, the macroporous substrate is infused with water for at least 1 minute to achieve full saturation.

Suitable examples of materials for use as the macroporous substrate may include, but are not limited to, polyethersulfone, polyphenylsulfone, polyacrylonitrile, polyester, polyether ether ketone, polyvinylidene fluoride, and polytetrafluoroethylene.

The macroporous substrate may have a thickness of from about 1 micrometer to about 3 millimeters.

The macroporous substrate layer will have larger pores than the block copolymer layer to ensure that anything that passes through the block copolymer layer also passes through the macroporous substrate layer. Preferably, the macroporous structure includes pore widths of about 1 μm to about 50 μm, or from about 1 μm to about 20 μm, or from about 1 μm to about 10 μm.

Other suitable modifications and adaptations of the variety of conditions and parameters normally encountered in the field, and which are obvious to those skilled in the art, are within the scope of the disclosure. All patents and publications cited herein are fully incorporated by reference herein in their entirety.

EXAMPLES

The following examples are illustrative, but not limiting, of the methods and compositions of the present disclosure.
Membrane Manufacture.

BCPs were dissolved overnight in toluene to form 1-3 wt % solutions and then passed through a 0.20 μm PTFE filter twice. BCP solution (0.5 ml) was then deposited onto water saturated PES and immediately spun cast. 40×50 mm PES rectangles were submerged in water for no less than 1 minute to ensure complete saturation. The saturated PES was then wiped with Kimwipe to remove excess water and placed on a Si wafer. Cohesion forces held the PES in place during spinning.

Spin casting was performed at 2000 rpm (1000 rpm acceleration) for 45 seconds after which the samples were dried overnight in ambient conditions before stretching. Stretching was performed using a custom built, computer controlled, linear extension stage. Membranes were clamped at either end leaving a 30 mm initial gap length. Membranes were then stretched to various extents at 1 mm/s before being removed and punched out with a 25 mm die.
Characterization of BCP Films.

Surface topography of the BCP thin films was characterized by a scanning electron microscopy (SEM) (Zeiss Ultra 60 field emission SEM). Prior to SEM imaging, samples were coated with carbon (Cressington 208Carbon) at 100 my for 10 seconds to reduce charge build up. Cross-sectional SEMs were performed after cryofracture (FIG. 7). Samples were soaked in ethanol and then immersed for 30 seconds in liquid nitrogen. Frozen samples broke upon bending. White light interferometry (Filmetric F-20 UVX) was used to measure film thickness when cast on a silicon substrate. Atomic force microscopy (AFM) (Asylum Research Cypher S) was performed on films after different plasma etching exposure times to reveal the morphology at different film depths (FIG. 8).
Membrane Permeability and Selectivity Testing.

Two stirred flow cells were used for testing, Advantec MFS Inc. UHP 25 (10 ml) and Millipore Amicon 8400 (3 ml). The first cell uses a flat porous spacer and was the primary cell used in this example. The second cell uses a mesh spacer that was used for investigating spacer geometry.

Deionized water (18.2 MΩ/cm) was pressurized at 0.2 bar and collected on a scale that recorded its weight every 10 seconds. After an initialization period the flux was constant and the slope of weight vs. time was used to calculate permeability (FIG. 9). Similar conditions were used for studying selectivity but in these studies AuNP solutions purchased from BBI solutions were filtered instead of deionized water. Rejection rates were determined by comparing AuNP absorption peak intensities before and after filtration using UV-Vis spectroscopy (Agilent Technologies Cary Series 6000i) (FIG. 10).
Composite Membrane Manufacture.

FIG. 1 shows the manufacturing process and membrane architecture. BCPs dissolved in a toluene solution were spun coated onto a water filled PES support (FIG. 1A) before being dried and uniaxially stretched using a computer controlled linear extension stage (FIG. 1B). A water immiscible solvent was necessary to cast a film on top of the water surface. The final membrane consisted of a thin BCP selective layer roughly 100 nm in thickness resting on top of a macroporous support (FIG. 9). The thin BCP selective layer ultimately defines the permeability and selectivity of a membrane while the macroporous support provides mechanical robustness. Before stretching (FIG. 1C), the BCPs phase separated into columns aligned perpendicular to the surface. Although columns often prefer to orient parallel to the surface, film thickness, directional evaporation, selective solvent use, casting on a neutral surface, and casting onto water, can create conditions where perpendicularly aligned pores are favored. After stretching (FIG. 1D) many of the columns cavitate and elongate creating a highly permeable porous structure from a previously dense and impermeable membrane.

Effect of Strain.

Figure 1A:
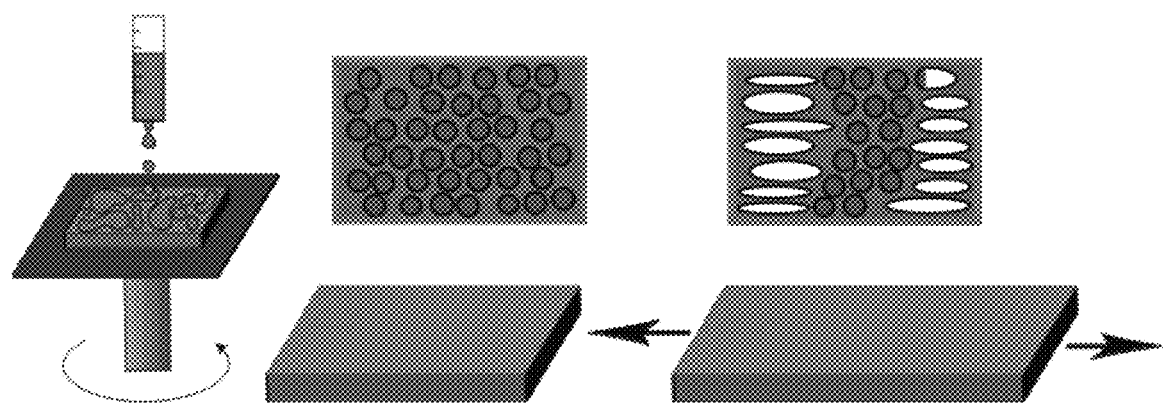
FIGS. 1A-1D show the strain induced nano cavitation process.
Figure 1B:
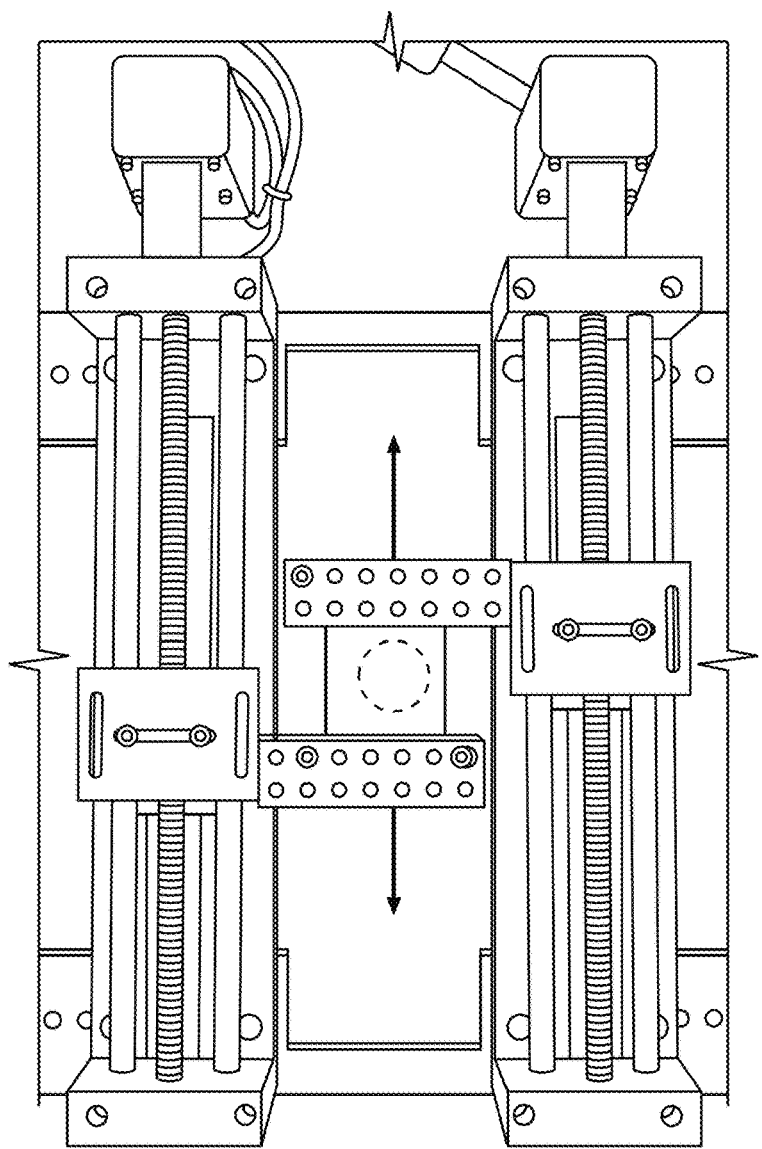
Figure 1C:
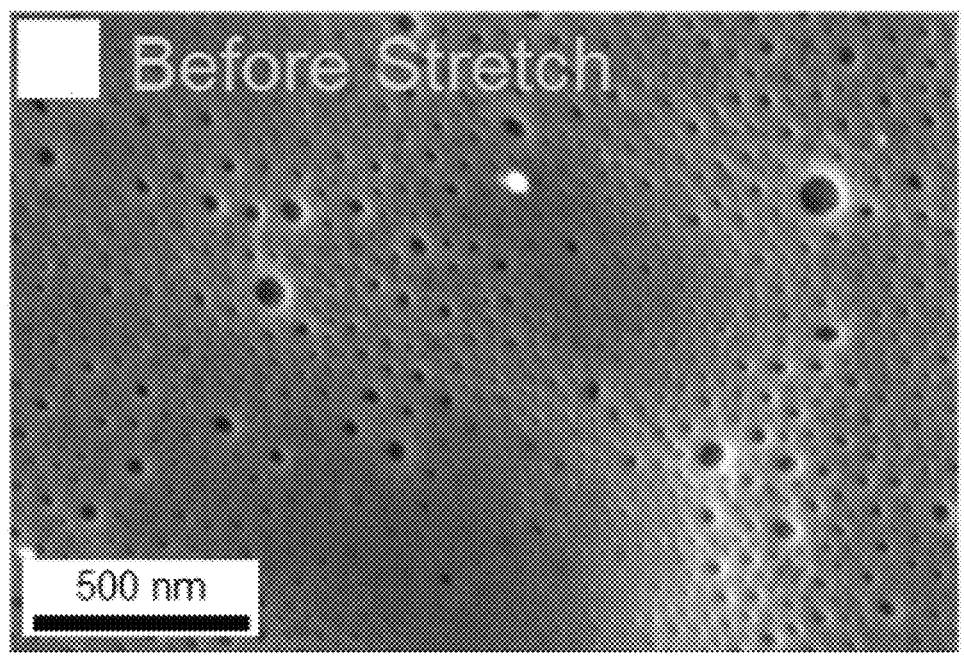
Figure 1D:
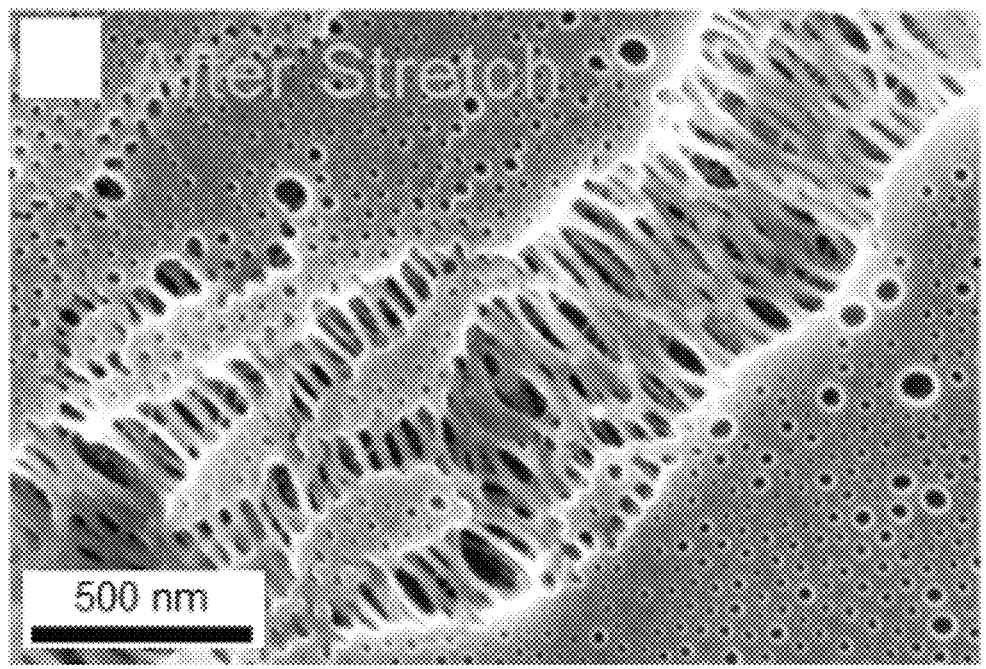
Figure 2A:
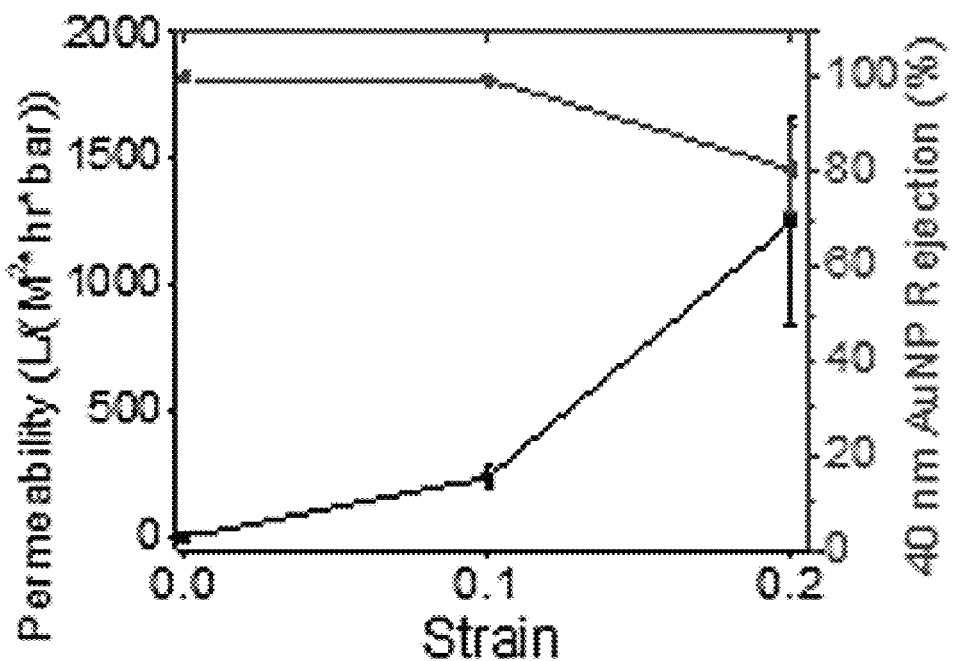
FIGS. 2A-2D show the effect of strain on PS-b-PEO 110 kDa membranes.
Figure 2B:
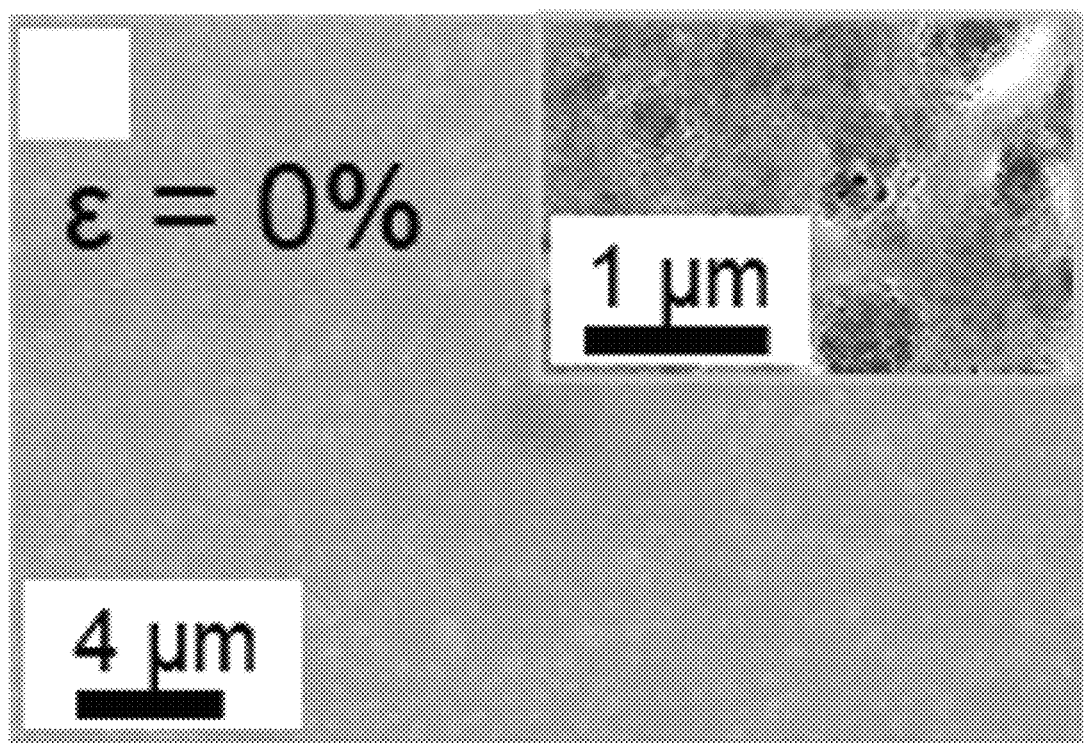
Figure 2C:
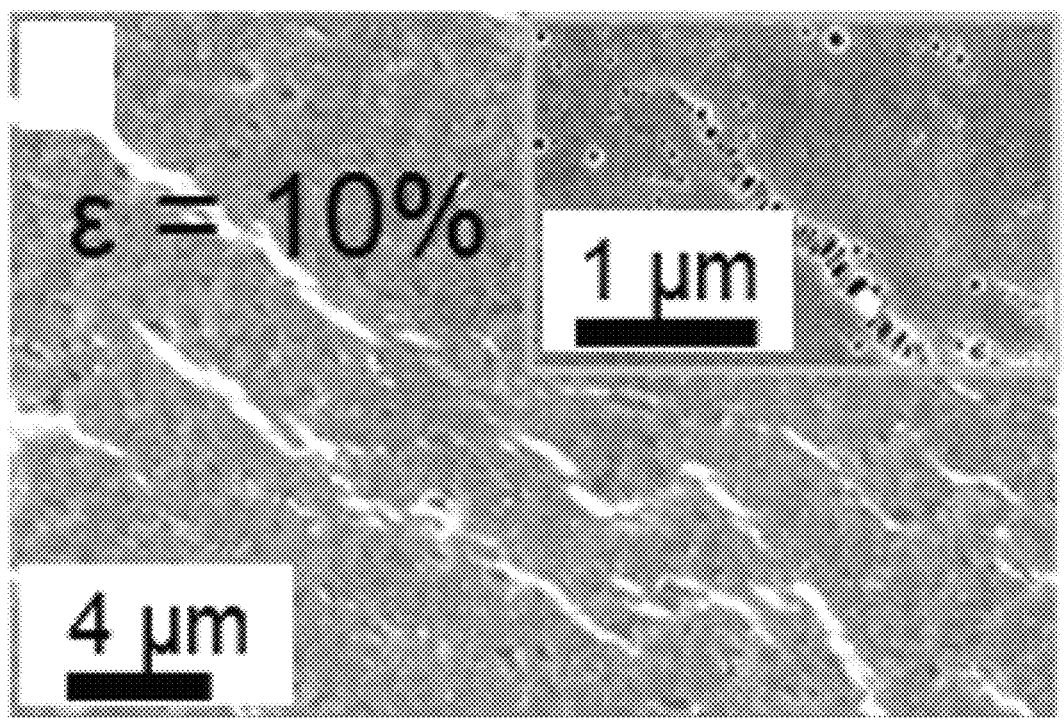
Figure 2D:
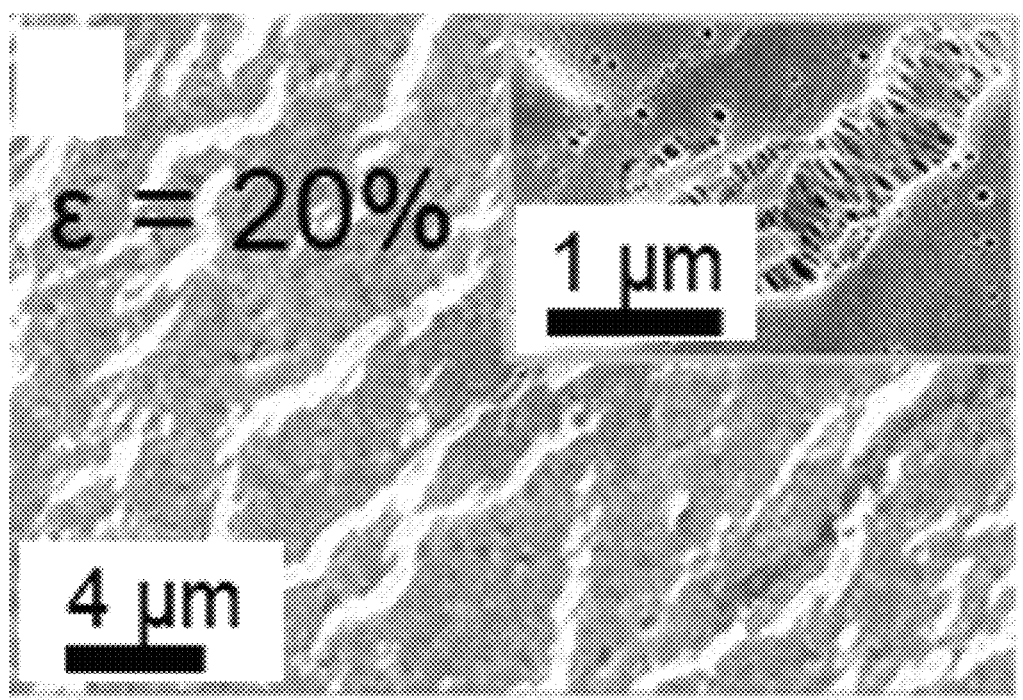

PS-b-PEO 110 kDa solution was cast onto PES and stretched to different extents to see the effect that strain had on membrane performance and morphology. Membrane performance, completed in triplicate, is shown in FIG. 2A. As expected, at higher strains permeability increased and rejection decreased due to the formation and growth of pores. It is notable that at 10% strain, near complete rejection of 40 nm AuNP was maintained with a flux of 237 L/(M$^2$*hr*bar) demonstrating a relatively small maximum pore size. By 20% strain, permeability increased to 1247 L/(M$^2$*hr*bar) while AuNP rejection was reduced to 80%. SEM images taken after 0%, 10%, and 20% strains are shown in FIGS. 2B-2D. The white lines observed in the images are imaging artifacts that occur due to charging effects that take place at the sharp edges formed by crazing. These bright streaks nicely show the size and density of the craze formed by tensile stretching. Zooming in on the white streaks (insets) revealed that crazing, not cracking, occurs in these zones. At 0% strain (FIG. 4C) no flow occurs, confirming that permeation through the membrane occurs through passages formed by strain rather than through innate holes formed during the self-assembly procedure. By 10% strain (FIG. 4C) many areas of deformation are present. These areas run perpendicular to the stretch direction and are held intact by threads of polymer. With further strain (FIG. 4D) the areas of deformation become more numerous and longer, but the integrity of the film remains intact.

Close investigation of SEM images showed that it is the PEO domains that cavitate and form the elongated pores. Early work investigating BCP toughness observed a similar "fishnet" crazing behavior in unsupported linear diblock polystyrene-b-polybutadiene (PS-b-PB) copolymer. It was concluded that the soft PB minor block cavitates once a critical negative pressure is exceeded, followed by necking and drawing of the PS matrix. The size of the holes left by crazing is determined by domain size. Similar behavior was observed in the present example. Across a membrane, the size of pores formed by crazing is substantially uniform, the pore width being defined by the original domain size. As strain was increased, the pores elongated, and the prevalence of crazing increased. This behavior is useful for membrane formation because permeability can be increased (higher craze density, longer pores) without loss of rejection (pore width remains the same). High aspect ratio pores have been shown theoretically, and experimentally, to be more permeable than circular pores without sacrificing selectivity. Up to 10% strain this held true, and to a certain extent it held true up to 20% strain, although a noticeable loss in rejection occurred. It is possible that some highly deformed areas may become too fragile and rupture once pressure is applied, allowing passage of the AuNPs.

Polymer Effect.

A glassy polymer can deform by crazing, shear, or cracking. As a pore forming strategy, only crazing is desirable. To determine which types of polymers craze when stretched on a PES support, various polymers were used as the selective layer and characterized. In addition to measuring membrane performance and morphology, a custom-built film-on-water tensile testing instrument (FIG. 3A) was used to measure their stress-strain curves (FIG. 3D). A description of the set-up is provided elsewhere. Two MWs of polystyrene (PS) homopolymer were used as a control to demonstrate the minor block effect. High MW PS failed in a ductile manner and formed shear deformation zones (SDZs) in the sample, while low MW PS failed in a brittle manner forming cracks (FIGS. 3B-3C). Despite PS being known for crazing, no crazing was observed in these samples illustrating the importance of the minor soft block for initiating crazing.

Two diblock copolymers were compared to see the effect of the minor block on crack formation. Both contained an equally sized hard PS block (78 kDa), and either a hard P2VP minor block (35 kDa), or a soft PEO minor block (30 kDa). BCPs containing a soft minor block failed in a ductile manner at a lower strain than PS thereby enabling craze formation, while BCPs containing hard minor blocks behaved in a manner similar to PS, forming SDZs (FIGS. 3D-3F). The correlation between mechanical properties and crack formation shows that to avoid cracking from deformation, the top selective layer must be ductile. Furthermore, craze formation only occurred in samples containing a soft minor block where crazing could be initiated.

Molecular Weight Effect. Molecular weight, as shown in the previous section, has a dramatic effect on the strength and deformation mechanism of the copolymer. In this section, it is demonstrated how the molecular weight of a BCP selective layer influences the mechanical properties and correlates the results to the membrane performance and crack behavior when stretched to 10% strain. Three PS-b-PEO BCP's of varying MW (110 kDa, 80 kDa, and 55 kDa) but with similar $V_f^{and}$ thickness were used. Higher MW BCPs were tougher and could be stretched to greater lengths before failure (FIG. 4A). PS-b-PEO 110 kDa has the highest ultimate stress, but more importantly it had the highest elongation at break and was the only film to fail in a ductile manner. Due to its inherent ductility, this high MW film formed crazes (FIG. 4B) that were able to completely reject 40 nm AuNPs. The 80 kDa sample whose mechanical properties showed brittle failure, cracked during stretch revealing the underlying PES morphology (FIG. 6D). Due to crack rather than craze formation, the 80 kDa sample had an increase of 24 times in permeability while rejecting less than half of the 40 nm AuNPs when compared to the 110 kDa sample. Lowering the MW further, 55 kDa SEO was not strong enough to even form a selective layer and the permeability of this sample was higher than could accurately be measured. Perhaps at such a low MW the selective layer was too weak to span the micron-sized pores of the PES substrate which resulted in unrestricted flow.

Thickness Effect.

Film thickness has been shown to impact the mechanical properties of thin films through the confinement effect. As shown earlier, a clear relationship exists between ductility and craze formation and therefore film thickness can influence membrane performance. Furthermore, as film thickness is increased, permeability decreases due to increased pore length. To explore the thickness effect, four composite membranes with varying selective layer thicknesses (PS-b-PEO 110 kDa) were stretched to 20% strain and tested for permeability and selectivity. Thickness variation was achieved by depositing different BCP concentrations (10-25 g/l) on the PES support. Reported thicknesses were estimated based on the thickness of each concentration when cast on a silicon wafer as measured by interferometry.

Membrane performance behaved predictably, with thicker membranes exhibiting lower permeability and higher rejection (FIG. 5A). This trend was further supported by tensile strength measurements of the BCP layers (FIG. 5D). A brittle to ductile transition occurs between 72 nm and 113 nm explaining the high flow and low rejection for the 50 nm thick sample (FIG. 5B). There is, however, a curious effect at thicknesses between 85 nm and 138 nm where rejection decreases significantly. This may occur because of a change in craze spacing. Comparing FIGS. 5C and 5E, a significant increase in crack spacing and width occurs. Narrower crazes in the thinner BCP would likely cause higher rejections, while still having higher permeability because the craze density is higher. Similar behavior has been previously reported for stretched films supported on an elastomeric substrate, where increasing thickness also increases crack spacing.

Membrane Spacer Effect.

Rather than using a machine to uniaxially stretch the membranes, natural deformation of the membrane around a spacer can create areas of adequate tension. From a manufacturing standpoint, using a spacer to generate the required strain is attractive because if the membrane stretching step could be eliminated, then the manufacturing process would be reduced to a step of casting a BCP solution onto a support, and large-scale production runs could be easily performed. To test this idea a woven spacer was used on an unstretched PS-b-PEO 110 kDa composite membrane. Spacers like this are commonly used in combination with commercial membranes to provide a path for permeate to exit the filtration device. It was immediately obvious that even under light pressures (0.2 bar) the areas of flow were determined by the spacer. A woven spacer (FIG. 6A) produces a pattern of deposited AuNPs exactly matching its own geometry (FIG. 6B). Close investigation of the pattern revealed that the pinkest areas were above the highest points of the spacer where the membrane is bent the most. These are the areas where the selective layer undergoes the greatest tensile stress. Under SEM (FIG. 6C), the difference between high flow and low flow areas was drastic and sharp. Areas of high flow were completely covered in AuNPs hiding their deformed pore structure, while areas of low flow showed no sign of deformation. 3 replicates of the spacer deformed membrane had an average permeability of 854 L/(M$^2$*hr*bar)±461 and an AuNP rejection of 97%±1.2%. Comparing this data to the performance shown in FIG. 2, similar performance could be achieved with a tensile strain of roughly 15%. Thus, spacers are an effective alternative to uniaxial stretching to promote cavitation induced pore formation.

Other embodiments of the present disclosure will be apparent to those skilled in the art from consideration of the specification and practice of the embodiments disclosed herein. As used throughout the specification and claims, "a" and/or "an" and/or "the" may refer to one or more than one. Unless otherwise indicated, all numbers expressing quantities, proportions, percentages, or other numerical values are to be understood as being modified in all instances by the term "about." Accordingly, unless indicated to the contrary, the numerical parameters set forth in the specification and claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1-4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description, or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A porous composite ultrafiltration membrane comprising:
    a block copolymer layer having a thickness of not more than about 500 nm, comprising
    a) one or more soft block polymer(s) having an elongation at break of greater than about 50%, as measured by ASTM D638 and an elastic modulus of between 10 MPa to 3 GPa as measured by the ASTM D638 tensile test; and
    b) one or more hard block polymer(s) having an elongation at break of less than about 65%, as measured by ASTM D638, and an elastic modulus of higher than 1 GPa as measured by the ASTM D638 tensile test; and
    c) a macroporous support layer having a pore size larger than a pore size of the block copolymer layer, and
    wherein tensile strain is applied to a composite membrane including elements a-c) to cause craze formation and form the porous composite ultrafiltration membrane.

2. The composite membrane of claim 1, wherein the one or more hard block polymer(s) comprises one or more blocks selected from the group consisting of a polystyrene block, a polymethacrylate block, a poly (methyl methacrylate) block, a polyvinylpyridine block, a polyvinylcyclohexane block, a polyimide block, a polyamide block, a polypropylene block, a poly (2,6-dimethyl-1,4-phenylene oxide) block, a polyolefin block, a poly (t-butyl vinyl ether) block, a poly (cyclohexyl methacrylate) block, a poly (cyclohexyl vinyl ether) block, poly (t-butyl vinyl ether) block, polyethylene block, and polyvinylidene fluoride block and combinations thereof.

3. The composite membrane of claim 1, wherein the block copolymer comprises a copolymer selected from the group consisting of polystyrene-block-polyethylene oxide, polystyrene-block-poly (4-vinylpyridine), polystyrene-block-poly (methyl methacrylate), and polystyrene-block-polylactide.

4. The composite membrane of claim 1, wherein the one or more soft block polymer(s) comprises a polyethylene (oxide) block.

5. The composite membrane of claim 1, wherein the one or more soft block polymer(s) is present in an amount of from about 5% by volume to less than 50% by volume, based on the total volume of the block copolymer.

6. The composite membrane of claim 1, wherein the one or more hard block polymer(s) is present in an amount of greater than 50% by volume to less than 95% by volume, based on the total volume of the block copolymer.

7. The composite membrane of claim 1, wherein the one or more soft block polymer(s) is covalently bonded to the one or more hard block polymer(s).

8. The composite membrane of claim 1, wherein the block copolymer layer has a thickness of greater than 50 nm to about 500 nm.

9. The composite membrane of claim 1, wherein the macroporous support comprises a polymer selected from the group consisting of polyethersulfone, polyphenylsulfone, polyacrylonitrile, polyester, polyether ether ketone, polyvinylidene fluoride, and polytetrafluoroethylene.

10. The composite membrane of claim 1, wherein pores of the block copolymer layer have a pore width of 1 nm to less than 40 nm.

11. The composite membrane of claim 1, wherein the one or more hard block polymer(s) has a number average molecular weight of from about 10,000 g/mol to about 500,000 g/mol, as measured by gel permeation chromatography.

12. The composite membrane of claim 1, wherein the one or more soft block polymer(s) has a number average molecular weight of from about 1,000 g/mol to about 75,000 g/mol, as measured by gel permeation chromatography.

13. The composite membrane of claim 1, wherein the block copolymer layer is devoid of random polymers.

14. The composite membrane of claim 1, wherein the macroporous support layer is saturated with water.

15. The composite membrane of claim 1, wherein the block copolymer layer comprises a poly(styrene) hard block and a poly(ethylene oxide) soft block.

16. The porous composite ultrafiltration membrane of claim 1, wherein the tensile strain stretches the composite membrane by at least 10%, based on an original dimension of the composite membrane.

* * * * *